(12) United States Patent
Ishiwaka et al.

(10) Patent No.: US 12,514,236 B2
(45) Date of Patent: Jan. 6, 2026

(54) INFORMATION PROCESSING METHOD, NON-TRANSITORY COMPUTER-READABLE RECORDING MEDIUM, AND INFORMATION PROCESSOR

(71) Applicants: SoftBank Corp., Tokyo (JP); NEURALX INC., Los Angeles, CA (US)

(72) Inventors: Yuko Ishiwaka, Tokyo (JP); Michael Eastman, Tokyo (JP); Sho Kakazu, Tokyo (JP); Masaki Nakada, Los Angeles, CA (US)

(73) Assignees: SOFTBANK CORP., Tokyo (JP); NEURALX INC., Los Angeles, CA (US)

( * ) Notice: Subject to any disclaimer, the term of this patent is extended or adjusted under 35 U.S.C. 154(b) by 217 days.

(21) Appl. No.: 17/512,694

(22) Filed: Oct. 28, 2021

(65) Prior Publication Data
US 2023/0135897 A1  May 4, 2023

(51) Int. Cl.
*A01K 61/95* (2017.01)
*A01K 61/10* (2017.01)

(52) U.S. Cl.
CPC .............. *A01K 61/95* (2017.01); *A01K 61/10* (2017.01)

(58) Field of Classification Search
CPC ........ A01K 61/10; A01K 61/13; A01K 61/90; A01K 61/95; G06T 13/40
USPC .................................................. 119/215, 216
See application file for complete search history.

(56) References Cited

U.S. PATENT DOCUMENTS

| 3,879,697 | A  | * | 4/1975 | Richard | ................. | G01S 15/96 |
| | | | | | | 43/17.1 |
| 6,563,503 | B1 | * | 5/2003 | Comair | ................... | G06T 13/20 |
| | | | | | | 345/475 |
| 6,859,207 | B2 | * | 2/2005 | Nougaret | ................ | G06T 13/00 |
| | | | | | | 345/474 |

(Continued)

FOREIGN PATENT DOCUMENTS

| CA | 3087370 A1 | 11/2019 |
| EP | 1 139 295 A2 | 10/2001 |

(Continued)

OTHER PUBLICATIONS

International Search Report and Written Opinion issued Jan. 17, 2023 in corresponding International Patent Application No. PCT/JP2022/040119, 9 pages.

(Continued)

*Primary Examiner* — Kimberly S Berona
*Assistant Examiner* — Kevin M Dennis
(74) *Attorney, Agent, or Firm* — XSENSUS LLP

(57) ABSTRACT

An information processing method implemented by a computer. The information processing method includes the step of acquiring an internal parameter value regarding a biological characteristic of fish, an external parameter value regarding a surrounding environment characteristic of the fish, and a shoaling parameter value regarding a shoaling characteristic that is a behavior of one fish with respect to other fish, and the step of generating a simulation image including a behavior of each fish in a fish school based on the internal parameter value, the external parameter value, and the shoaling parameter value that are acquired in the step of acquiring.

18 Claims, 18 Drawing Sheets

(56) References Cited

U.S. PATENT DOCUMENTS

| | | | | |
|---|---|---|---|---|
| 10,599,922 | B2* | 3/2020 | James | G06T 7/62 |
| 11,234,141 | B2* | 1/2022 | Ananth | H04L 41/0894 |
| 11,645,354 | B2* | 5/2023 | Quan | G06F 30/20 |
| | | | | 119/269 |
| 2002/0093503 | A1* | 7/2002 | Nougaret | G06T 13/00 |
| | | | | 345/474 |
| 2009/0135187 | A1* | 5/2009 | Lee | G06T 13/40 |
| | | | | 345/473 |
| 2009/0229532 | A1* | 9/2009 | Herbert | A01K 61/00 |
| | | | | 43/4.5 |
| 2018/0084765 | A1* | 3/2018 | Kanwal | A01K 63/003 |
| 2020/0116858 | A1 | 4/2020 | Nagai | |
| 2021/0248289 | A1* | 8/2021 | Fasano | G05B 17/02 |
| 2023/0078448 | A1* | 3/2023 | Cella | G06Q 10/06311 |
| | | | | 705/7.13 |
| 2023/0102365 | A1* | 3/2023 | Quan | G06F 30/28 |
| | | | | 119/269 |
| 2023/0154225 | A1* | 5/2023 | James | G06V 20/64 |
| | | | | 382/110 |
| 2023/0389530 | A1 | 12/2023 | Nishikawa | |

FOREIGN PATENT DOCUMENTS

| | | | |
|---|---|---|---|
| EP | 3484282 B1 | 9/2020 | |
| JP | H11-7233 A | 1/1999 | |
| JP | 2001344615 A | 12/2001 | |
| JP | 2008242596 A | 10/2008 | |
| JP | 2013084181 A | 5/2013 | |
| JP | 2022055140 A | 4/2022 | |
| WO | 2019/045091 A1 | 3/2019 | |
| WO | 2019232247 A1 | 12/2019 | |
| WO | WO-2020214699 A1 * | 10/2020 | G06F 16/26 |

OTHER PUBLICATIONS

Nakamine, Hiroshi et al., "Effect of Autonomous Decentralized Mechanism in Fish Behavior", Systems, Control and Information, 1995, vol. 8, No. 8, pp. 350-356, section 3.1 (with English Abstract).

Chigusa, Yasutami et al., New video synthesis based on flocking-behavior simulation, IEICE Technical Report, 2010, vol. 110, No. 148, pp. 29-34, section 4 (with English Abstract).

Non-Final Office Action mailed Jan. 19, 2024 in related U.S. Appl. No. 17/875,428 (82 pages).

Mauri G., and J. Mauri. "Simulator software for marine fish farms sustainability." WSEAS Transactions on Environment and Development 3.12 (2007): 214-22. (Year: 2007).

Álvarez-Tuñón, Olaya, Alebert Jardón, and Carlos Balaguer. "Generation and processing of simulated underwater images for infrastructure visual inspection with uuvs." Sensors 19.24 (2019): 5497 (Year: 2019).

Final Office Action mailed Jun. 25, 2024 in related U.S. Appl. No. 17/875,428 (70 pages).

Notice of Reasons for Refusal mailed Jan. 21, 2025 in corresponding Japanese application No. 2024-510280 (5 pages; with English machine translation).

Partial Supplementary European Search Report issued on May 30, 2025 in related European patent application No. 23846711.2 (14 pages).

Ishiwaka Yuko et al.: "Foids", ACM Transactions on Graphics, ACM, NY, US, vol. 40, No. 6, Dec. 10, 2021 (Dec. 10, 2021), pp. 1-15, XP059179497, US; DOI: 10.1145/3478513.3480520.

Li Daoliang et al., "Automatic recognition 4-6 methods of fish feeding behavior in aquaculture: A review", Aquaculture, Elsevier, Amsterdam, NL, vol. 528, May 23, 2020.

Extended European Search Report mailed Oct. 22, 2025 in corresponding European patent application No. 22887111.7 (12 pages).

Office Action mailed Sep. 10, 2025 in related U.S. Appl. No. 18/418,388 (87 pages).

* cited by examiner

FIG.3
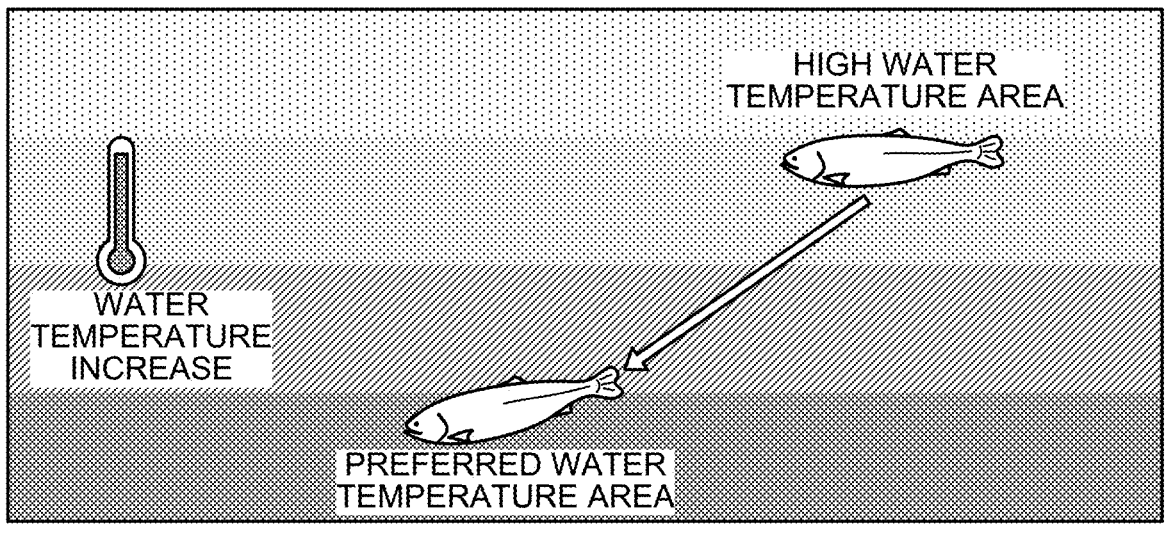
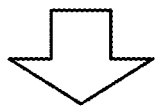
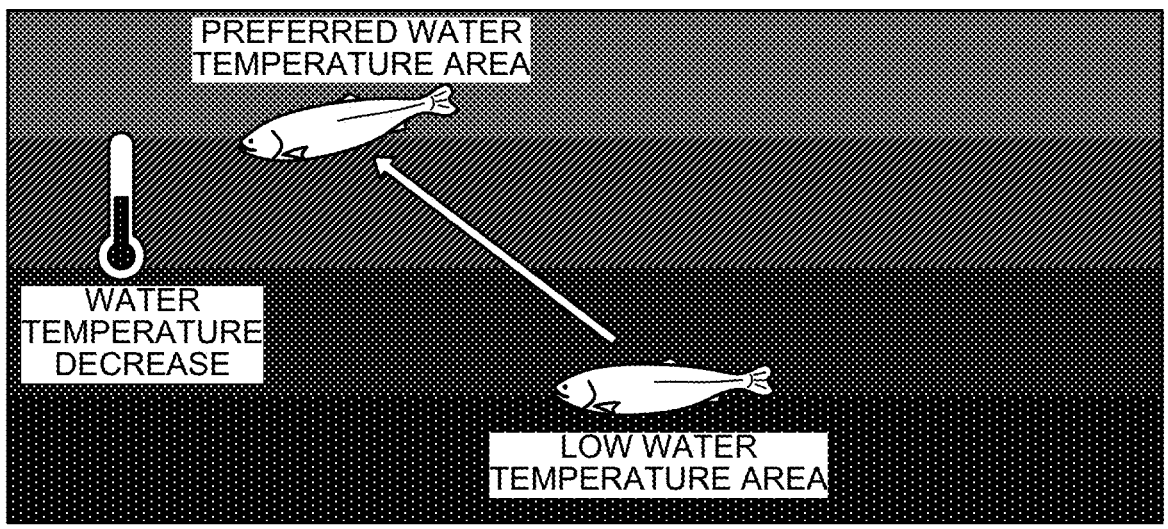

INFORMATION PROCESSING METHOD, NON-TRANSITORY COMPUTER-READABLE RECORDING MEDIUM, AND INFORMATION PROCESSOR

BACKGROUND OF THE INVENTION

1. Field of the Invention

The present invention relates to an information processing method, a non-transitory computer-readable recording medium, and an information processor.

2. Description of the Related Art

Deep Learning has produced excellent results in areas of computer vision and voice recognition. For example, in fish farms, counting a school of fish in an aquaculture cage is difficult, and it is expected that the use of deep learning will reduce the difficulty.

Patent Literature 1: WO 2019/045091

Meanwhile, an accuracy of analysis using deep learning depends on training data. Specifically, in order to obtain highly accurate analysis results, it is necessary to train a machine learning model with a large amount of training data covering various patterns. For example, in order to accurately estimate fish school information (e.g., fish counts) from a captured image capturing a fish school in an aquaculture cage using computer vision, it is necessary to train the machine learning model with a large amount of training data covering combinations of various conditions, including a surrounding environment of fish, fish species, and fish counts.

However, it is not easy to create a large amount of training data that covers various patterns. For example, it is extremely difficult to create a large amount of training data by manually assigning correct answer data to each of a huge number of images covering combinations of various conditions.

As a result, when the large amount of training data covering various patterns cannot be obtained, high-quality training cannot be provided to the machine learning model. Thus, it may be difficult to accurately estimate the fish school information from actual captured images.

SUMMARY OF THE INVENTION

It is an object of the present invention to at least partially solve the problems in the conventional technology.

According to one aspect of an embodiment, an information processing method implemented by a computer, the information processing method comprising:
  acquiring an internal parameter value regarding a biological characteristic of fish, an external parameter value regarding a surrounding environment characteristic of the fish, and a shoaling parameter value regarding a shoaling behavior characteristic that is a behavior of one fish with respect to other fish; and
  generating a simulation image including a behavior of each fish in a fish school based on the internal parameter value, the external parameter value, and the shoaling parameter value acquired in the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a relationship between a water temperature and a fish behavior;

DETAILED DESCRIPTION OF THE PREFERRED EMBODIMENTS

Figure 1:
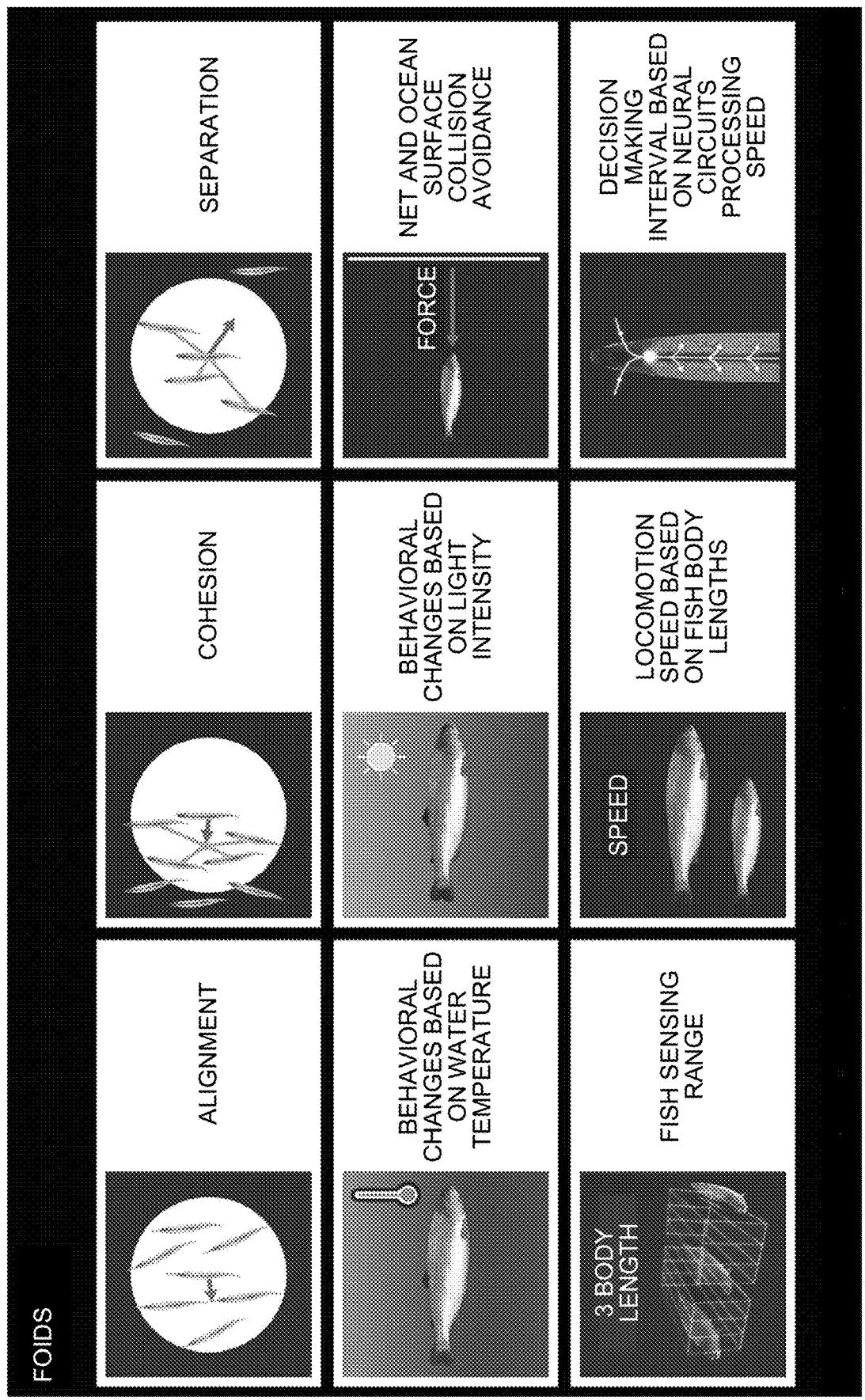
FIG. 1 is a diagram illustrating an outline of nine parameters used for generating a simulation image according to an embodiment.

Hereinafter, aspects for realizing an information processing method, a non-transitory computer-readable recording medium, and an information processor according to the present disclosure (hereinafter referred to as "embodiments") will be described in detail with reference to the drawings. The information processing method, the non-transitory computer-readable recording medium, and the information processor according to the present application are not limited by the embodiments. Further, in each of the following embodiments, same parts are given the same reference signs to omit duplicate description.

Embodiment

1. Introduction

Fish farming has been attracting attention as an approach to solve global food problems. In order to supply high quality fish through fish farming, it is important to know the exact number of fish that is closely related to feeding (feeding the fish).

However, it may be difficult to utilize aboveground IT technology in a special environment of fish farms underwater. Therefore, conventionally, a person scoops some fish with a net, weighs them, and then visually counts the number of fish. This method has problems such as a heavy stress on fish and lack of accuracy.

Therefore, in recent years, a method attracting attention is to automatically count the number of fish in a fish school in an image of the fish school captured in an aquaculture cage using computer vision. More specifically, it is a method of training a machine learning model for image recognition to estimate fish counts in the fish school from a captured image. However, in order to accurately estimate the fish counts in the captured image using the machine learning model, it is necessary to train the machine learning model with a large amount of training data covering combinations of various conditions such as the environment around the fish (e.g., season, time of day, weather, water temperature, light intensity, and water contamination level) and biological characteristics of fish (e.g., fish species, fish size, fish locomotion speed, and fish counts).

However, it is not easy to create a large amount of training data that covers the combinations of various conditions as described above. For example, it is extremely difficult to create a large amount of training data by manually assigning correct answer data to each of a huge number of images covering combinations of various conditions. In addition, a quality of training data is also important for accurately estimating the number of fish in the captured image using the machine learning model. However, when the correct answer data is manually assigned, the quality of the training data may not be always high.

As a result, when a large amount of training data covering various patterns cannot be obtained, high-quality training cannot be provided to the machine learning model. Therefore, it has been difficult in some cases to accurately estimate fish school information from an actually captured image.

In contrast, an information processor according to the embodiment generates a simulation image including a behavior of each fish in the fish school based on internal parameter values regarding biological characteristics of fish, external parameter values regarding surrounding environment characteristics of the fish, and shoaling parameter values regarding shoaling characteristics that are behaviors of one fish with respect to other fish.

FIG. 1 is a diagram illustrating an outline of nine parameters used for generating the simulation image according to the embodiment. The information processor according to the embodiment generates the simulation image including the behavior of each fish in the fish school based on nine parameter values illustrated in FIG. 1. An upper row in FIG. 1 illustrates shoaling parameters regarding three shoaling characteristics (alignment, cohesion, and separation). The middle row in FIG. 1 illustrates external parameters regarding a water temperature, a light intensity, an aquaculture cage net, and the like. The lower row in FIG. 1 illustrates internal parameters such as a shoaling zone, a relationship between a fish size and a locomotion speed, and a decision-making time required for fish. These nine parameters will be described in detail later.

In this way, an information processor 100 generates the simulation image including a behavior of fish school based on information on the biological characteristics of fish, information on the environment around the fish, and information on the shoaling characteristics of the fish. Accordingly, it is possible to accurately reproduce the behavior of fish school in an actual aquaculture cage. Still more, the information processor 100 can easily generate a large amount of simulation images covering various patterns by changing values of a plurality of parameters used for generating the simulation images. Furthermore, since the information processor 100 can utilize parameter values used for generating the simulation images as the correct answer data, a large amount of high-quality training data can be easily generated, compared with the case where the correct answer data is manually assigned.

This makes it possible for the information processor 100 to train the machine learning model for estimating, for example, the fish school information (e.g., fish counts) from the captured images using a large amount of high-quality training data. In other words, the information processor 100 can improve an estimation accuracy of the machine learning model for estimating, for example, the fish school information (e.g., fish counts) from the captured images by providing a large amount of high-quality training data for training. Therefore, the information processor 100 is capable of accurately estimating the fish school information.

2. Configuration of Information Processor

Figure 2:
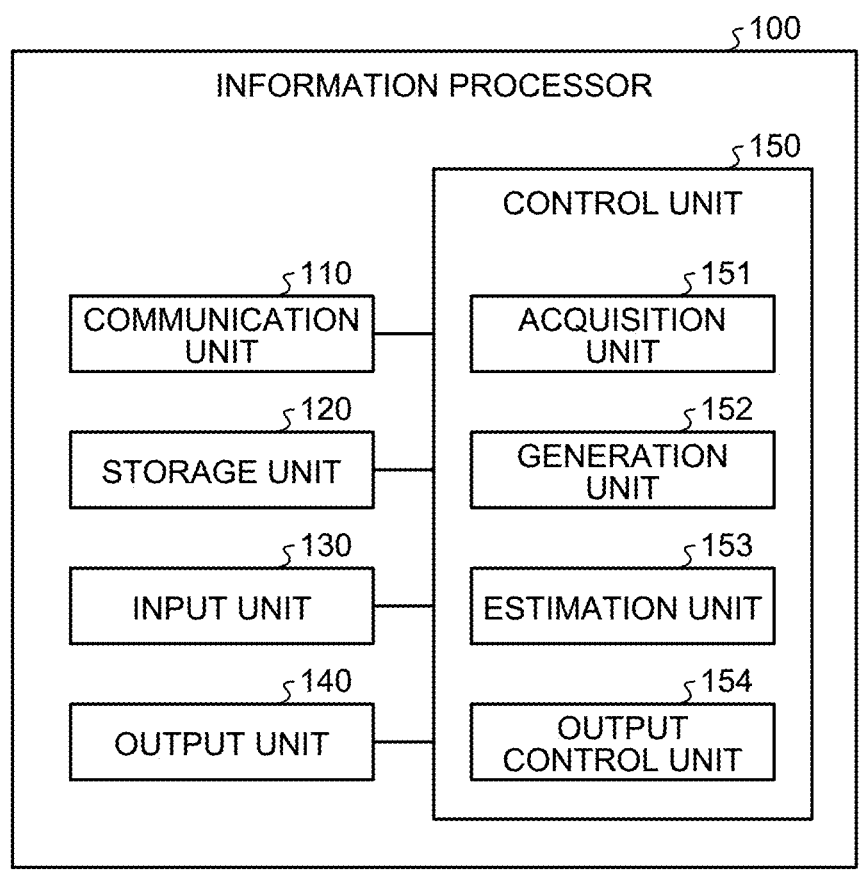
FIG. 2 is a diagram illustrating a configuration example of an information processor according to the embodiment.

FIG. 2 is a diagram illustrating a configuration example of the information processor 100 according to the embodiment. The information processor 100 includes a communication unit 110, a storage unit 120, an input unit 130, an output unit 140, and a control unit 150.

Communication Unit 110

The communication unit 110 is realized by, for example, a network interface card (NIC) or the like. The communication unit 110 is connected to a network in a wired or wireless manner to transmit and receive information to and from a terminal device used by, for example, a manager who manages fish.

Storage Unit 120

The storage unit 120 is realized by, for example, a semiconductor memory element such as a random access memory (RAM) or a flash memory, or a storage device such as a hard disk or an optical disk. Specifically, the storage unit 120 stores various programs (an example of an information processing program) used in simulation. Further, the storage unit 120 stores various parameter values used in the simulation.

Input Unit 130

A user inputs various operations to the input unit 130. For example, the input unit 130 may accept various operations from the user via a display surface (e.g., output unit 140) by a touch panel function. Further, the input unit 130 may accept various operations via a button provided on the information processor 100, or a keyboard or a mouse connected to the information processor 100.

Output Unit 140

The output unit 140 is a display screen realized by, for example, a liquid crystal display, an organic electro-luminescence (EL) display, or the like, and is a display device configured to display various types of information. The output unit 140 displays the various types of information according to control by the control unit 150. When the information processor 100 adopts the touch panel, the input unit 130 and the output unit 140 are integrated. Further, in the following description, the output unit 140 may be described as a screen.

Control Unit 150

The control unit 150 is a controller and is realized by, for example, a central processing unit (CPU), a micro processing unit (MPU), or the like executing various programs (equivalent to the example of the information processing program) stored in the storage device inside the information processor 100 with the RAM as a work area. Further, the control unit 150 is the controller and is realized by, for example, an integrated circuit such as an application specific integrated circuit (ASIC) or a field programmable gate array (FPGA).

The control unit 150 includes an acquisition unit 151, a generation unit 152, an estimation unit 153, and an output control unit 154 as functional units, and may realize or execute information processing described below. An internal configuration of the control unit 150 is not limited to the configuration illustrated in FIG. 2, and may be another configuration as long as it is configured to perform information processing described later. Further, each of the functional units shows the function of the control unit 150, and does not necessarily have to be physically distinguished.

Acquisition Unit 151

The acquisition unit 151 acquires the internal parameter values regarding the biological characteristics of fish, the external parameter values regarding the surrounding environment characteristics of the fish, and the shoaling parameter values regarding the shoaling characteristics that are the behaviors of one fish with respect to other fish. Specifically, the acquisition unit 151 acquires the internal parameter values, the external parameter values, and the shoaling parameter values input by the user via the input unit 130. It is noted that the various parameter values can vary depending on each species of fish.

More specifically, the acquisition unit 151 acquires the internal parameter values set for each fish in the fish school included in the simulation image. For example, when N (N is a natural number) is the number of fish in the fish school included in the simulation image, the acquisition unit 151 acquires N values of the internal parameter set for N individuals of fish, respectively.

In addition, the acquisition unit 151 acquires the shoaling parameter values set for the fish school included in the simulation image. As for the shoaling parameter values, a common value is set to each fish in the fish school. For example, when N (N is a natural number) is the number of fish in the fish school included in the simulation image, the acquisition unit 151 acquires a common shoaling parameter value for all of N individuals of fish.

Further, the acquisition unit 151 acquires the external parameter values set for each surrounding environment of the fish school included in the simulation image. For example, the acquisition unit 151 acquires an external parameter value set to each aquaculture cage where the fish school included in the simulation image is located. For example, the acquisition unit 151 acquires the external parameter values that differ by water depth of the aquaculture cage where the fish school included in the simulation image is located.

Generation Unit 152

The generation unit 152 generates the simulation images by controlling a behavior of each fish in the fish school based on the internal parameter values, the external parameter values, and the shoaling parameter values acquired by the acquisition unit 151. The following describes in detail a case where the generation unit 152 controls the behavior of each fish in the fish school based on the internal parameter values, external parameter values, and the shoaling parameter values with reference to FIG. 3 to FIG. 8.

FIG. 3 is a diagram illustrating a relationship between a water temperature and a fish behavior. As the biological characteristics of fish, it is known that each individual fish has a preferred water temperature, and the each individual fish swims toward the preferred water temperature area. In an example illustrated in an upper part of FIG. 3, a water temperature around the fish is higher than the preferred water temperature of the fish. Therefore, the generation unit 152 controls the fish behavior, so that the fish swims toward the preferred water temperature area. Further, in an example illustrated in a lower part of FIG. 3, the water temperature around the fish is lower than the preferred water temperature of the fish. Therefore, the generation unit 152 controls the fish behavior, so that the fish swims toward the preferred water temperature area. For example, the generation unit 152 controls a swimming direction of the fish, so that the fish swims in a direction toward the preferred water temperature area. In this way, the generation unit 152 controls the behavior of each fish to swim toward the preferred water temperature area based on, as the internal parameter value, the water temperature preferred by each fish in the fish school.

It is also known that a water temperature distribution in the aquaculture cage varies by season (or seasonal tidal current) and water depth. In the example illustrated in the upper part of FIG. 3, the water temperature in the aquaculture cage is high because the season is summer and the Kuroshio current flows into the aquaculture cage where the fish are located. It is also known that the water temperature in the aquaculture cage in summer is higher as it is closer to the water surface of the aquaculture cage and lower as it is closer to the bottom of the aquaculture cage. Therefore, as the external parameter values, the generation unit 152 changes the water temperature distribution in the aquaculture cage according to the water depth, so that the water temperature is higher as it is closer to the water surface of the aquaculture cage and the water temperature is lower as it is closer to the bottom of the aquaculture cage. Further, in the example illustrated in the lower part of FIG. 3, the water temperature in the aquaculture cage is low because the season is winter and the Oyashio current flows into the aquaculture cage where the fish are located. It is also known that the water temperature in the aquaculture cage in winter is lower as it is closer to the water surface of the aquaculture cage and higher as it is closer to the bottom of the aquaculture cage. Therefore, as the external parameter values, the generation unit 152 changes the water temperature distribution in the aquaculture cage according to the water depth, so that the water temperature is lower as it is closer to the water surface of the aquaculture cage and the water temperature is higher as it is closer to the bottom of the aquaculture cage. In this way, the generation unit 152 controls the behavior of each fish to swim toward the preferred water temperature area based on, as the external parameter value, the water temperature distribution in the aquaculture cage where each fish in the fish school is located.

Further, as the biological characteristics of fish, it is known that the higher the water temperature around the fish, the faster the locomotion speed of the fish, and the lower the water temperature around the fish, the slower the locomotion speed of the fish. Therefore, the generation unit 152 controls the behavior of each fish, so that each fish swims faster as the water temperature around each fish in the fish school increases based on, as the internal parameter value, the water temperature distribution in the aquaculture cage where each fish in the fish school is located.

Figure 4:
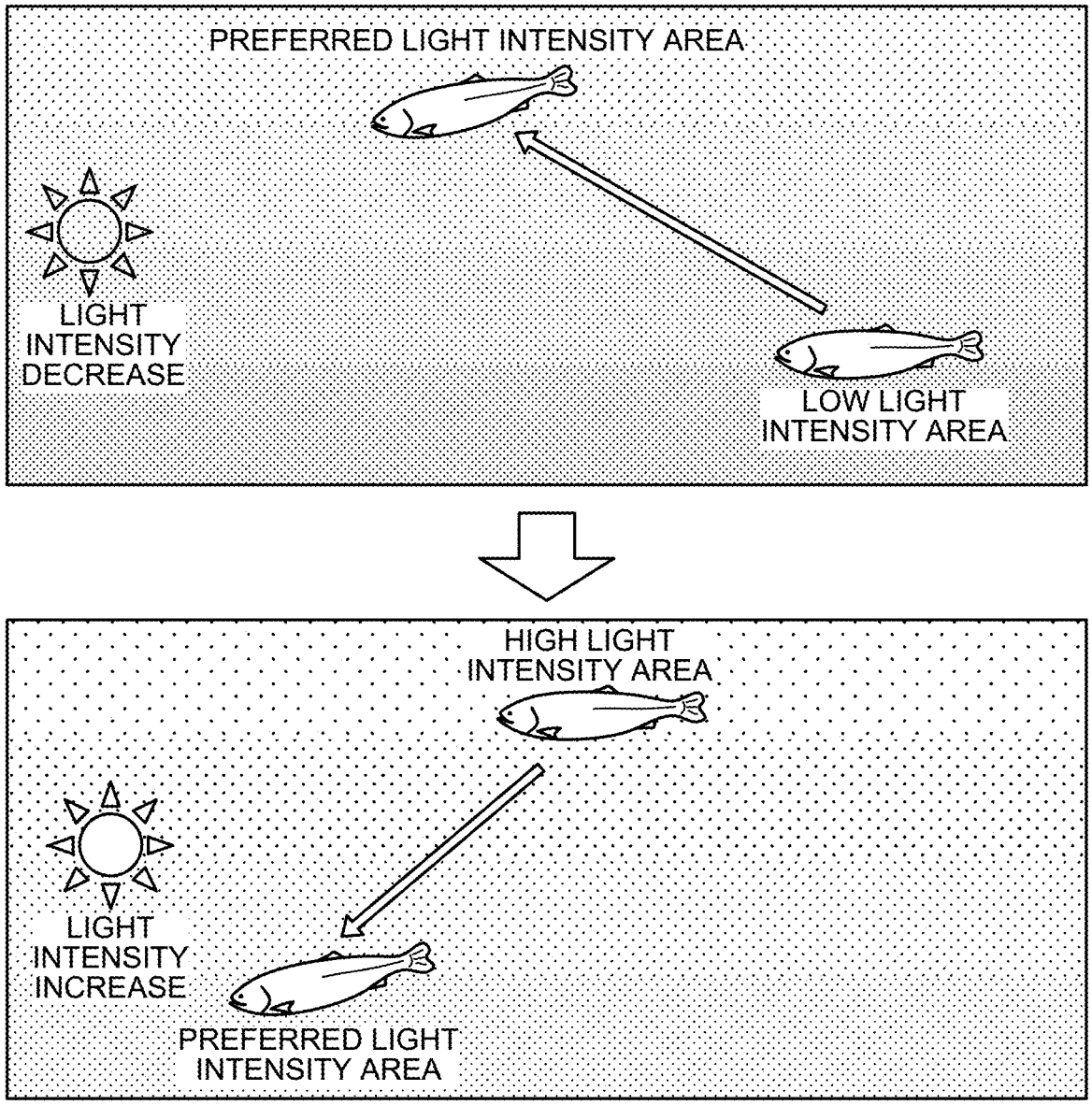
FIG. 4 is a diagram illustrating a relationship between a light intensity and the fish behavior.

FIG. 4 is a diagram illustrating a relationship between a light intensity and the fish behavior. As the biological characteristics of fish, it is known that each individual fish has a preferred light intensity, and the each individual fish swims toward a preferred light intensity area. In an example illustrated in an upper part of FIG. 4, the light intensity around the fish is lower than the preferred light intensity of the fish. Therefore, the generation unit 152 controls the fish behavior, so that the fish swims toward the preferred light intensity area. Further, in an example illustrated in a lower part of FIG. 4, the light intensity around the fish is higher than the preferred light intensity of the fish. Therefore, the generation unit 152 controls the fish behavior, so that the fish swims toward the preferred light intensity area. For example, the generation unit 152 controls a fish swimming direction, so that the fish swims toward the preferred light intensity area. In this way, the generation unit 152 controls the behavior of each fish to swim toward the preferred light intensity area based on, as the internal parameter value, the light intensity preferred by each fish in the fish school.

It is also known that a light-intensity distribution in the aquaculture cage varies by season, time of day, weather, and water depth. In the example illustrated in the upper part of FIG. 4, the season is winter (or the time is morning or night, etc.), and the light intensity in the aquaculture cage is low. Further, in the example illustrated in the lower part of FIG. 4, the season is summer (or the time is daytime, etc.), and the light intensity in the aquaculture cage is high. Further, it is known that the light intensity in the aquaculture cage is generally higher as it is closer to the water surface of the aquaculture cage and lower as it is closer to the bottom of the aquaculture cage. Therefore, as the external parameter values, the generation unit 152 changes the light-intensity distribution in the aquaculture cage according to the water depth, so that the light intensity is higher as it is closer to the water surface of the aquaculture cage and the light intensity is lower as it is closer to the bottom of the aquaculture cage. In this way, the generation unit 152 controls the behavior of each fish to swim toward the preferred light intensity area based on, as the external parameter value, the light-intensity distribution in the aquaculture cage where each fish in the fish school is located.

Figure 5:
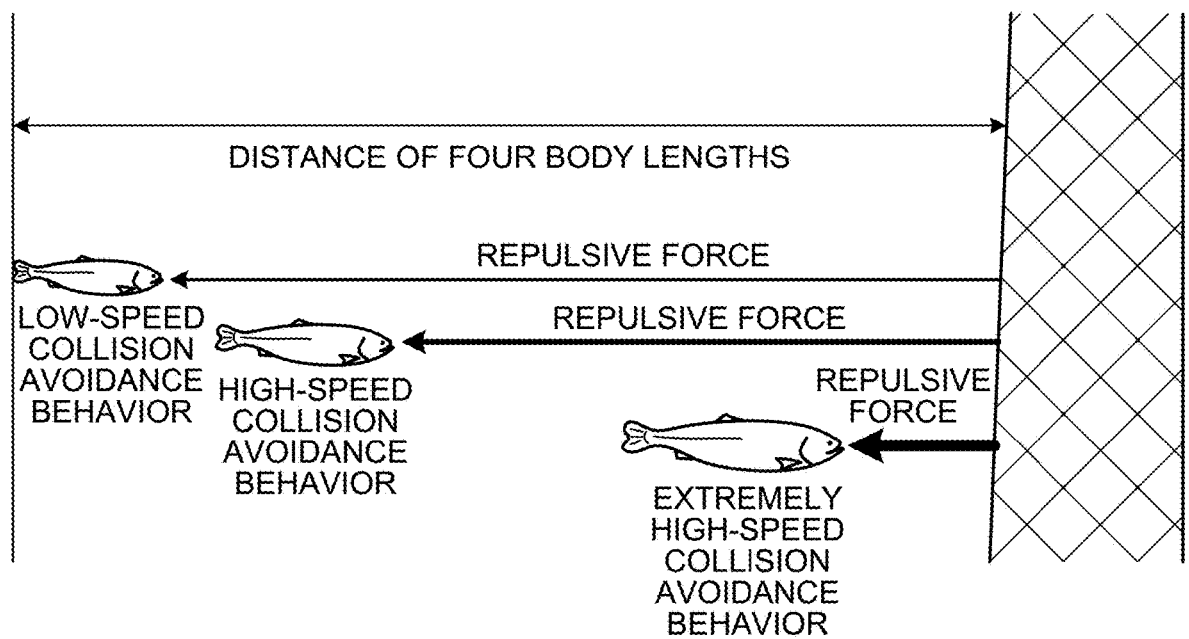
FIG. 5 is a diagram illustrating a relationship between an aquaculture cage net and the fish behavior.

FIG. 5 is a diagram illustrating a relationship between an aquaculture cage net and the fish behavior. As the biological characteristics of fish, it is known that when the fish approaches an obstacle such as the aquaculture cage net or the water surface of the aquaculture cage, the fish performs an avoidance behavior to avoid the obstacle. The inventors of the present disclosure has obtained an experiment result that when a distance between fish and the obstacle is four times or less the body length of the fish, the fish detects the obstacle and behaves to avoid the obstacle. Therefore, the generation unit 152 controls the behavior of each fish to avoid the obstacle when the distance between each fish in the fish school and the obstacle, as the internal parameter value, is equal to or less than a predetermined threshold (e.g., a predetermined multiple of the body length of each fish).

Further, as illustrated in FIG. 5, it is known as the biological characteristics of fish that the closer (farther) the distance between the fish and the aquaculture cage net is, the faster (slower) the fish performs a collision avoidance behavior. Therefore, the generation unit 152 controls the behavior of each fish according to the larger repulsive force as the distance decreases between each fish in the fish school and the obstacle. Here, the repulsive force refers to a force by which the fish tries to move away from the obstacle in order to avoid collision with the obstacle. For example, when the distance between the fish and the obstacle is equal to or less than a predetermined threshold, the generation unit 152 controls the fish behavior based on the repulsive force having a magnitude proportional to the distance between the fish and the obstacle. For example, the generation unit 152 controls the fish behavior, so that the fish avoids the obstacle (aquaculture cage net in FIG. 5) by the repulsive force acting on the fish in a direction opposite to the fish swimming direction (fish direction toward the aquaculture cage net in FIG. 5). In this way, the generation unit 152 controls the behavior of each fish based on, as the internal parameter value, the repulsive force acting on each fish when the distance between each fish in the fish school and the obstacle is equal to or less than the predetermined threshold.

Figure 6:
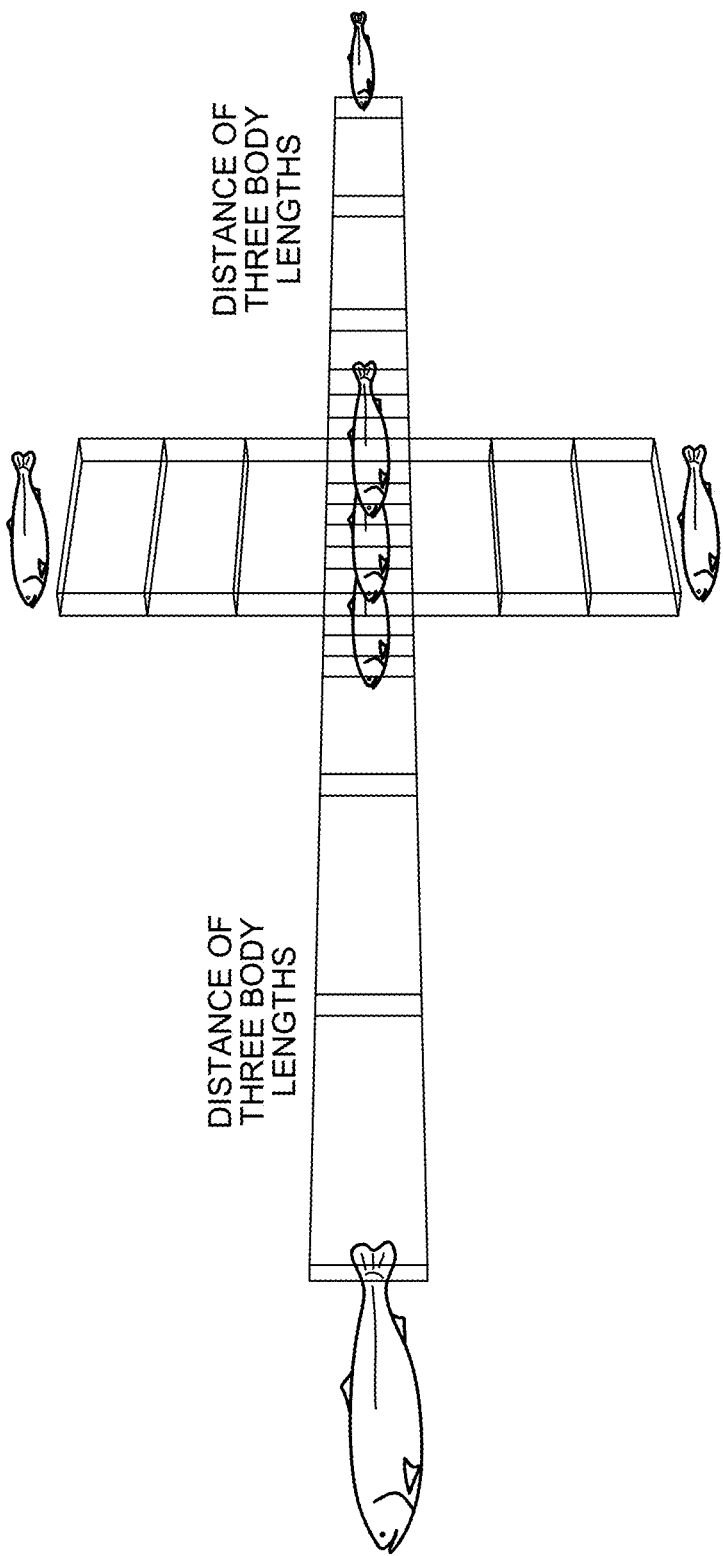
FIG. 6 is a diagram illustrating a zone that one fish shoals with other fish.

FIG. 6 is a diagram illustrating a zone that one fish shoals with other fish. As the biological characteristics of fish, it is known that fish shoals with its neighboring fish. The inventors of the present disclosure has obtained an experiment result that the fish detects other fish located within a distance of three body lengths of the fish, and shoals with other fish located within the distance of three body lengths. Therefore, the generation unit 152 controls the behavior of each fish, so that each fish performs a shoaling behavior when other fish are located within a predetermined zone (e.g., within a distance of a predetermined multiple of the body length of each fish), as the shoaling parameter value, from the position of each fish in the fish school.

Here, the shoaling behavior of fish with respect to other fish refers to the behavior that follows three rules of cohesion, separation, and alignment. "Cohesion" is a force that tries to bring individuals closer to each other so that they do not fall apart (hereinafter, also referred to as a cohesion force), "separation" is a force that individuals try to separate from each other to avoid collision (hereinafter, also referred to as a separation force), and "alignment" refers to a force that tries to align a direction of individuals to swim in a group (hereinafter, also referred to as an alignment force). The fish behavior is determined by the sum of these three forces. In the following description, the three forces of cohesion force, separation force and alignment force are collectively referred to as the "shoaling parameter". Each of the three forces is determined by parameter values indicating a magnitude of the force, a direction of the force, and a force-affected zone. For example, the shoaling parameter is determined by the size of space in which the fish school is located (e.g., aquaculture cage), a fish size, and a density of the fish school. In this way, the generation unit 152 controls the behavior of each fish based on, as the shoaling parameter values, the cohesion force that tries to bring individuals in the fish school closer to each other so as not to fall apart, the separation force that individuals in the fish school try to separate from each other to avoid collision, and the alignment force that tries to align a direction of individuals in the fish school to swim in a group.

Figure 7:
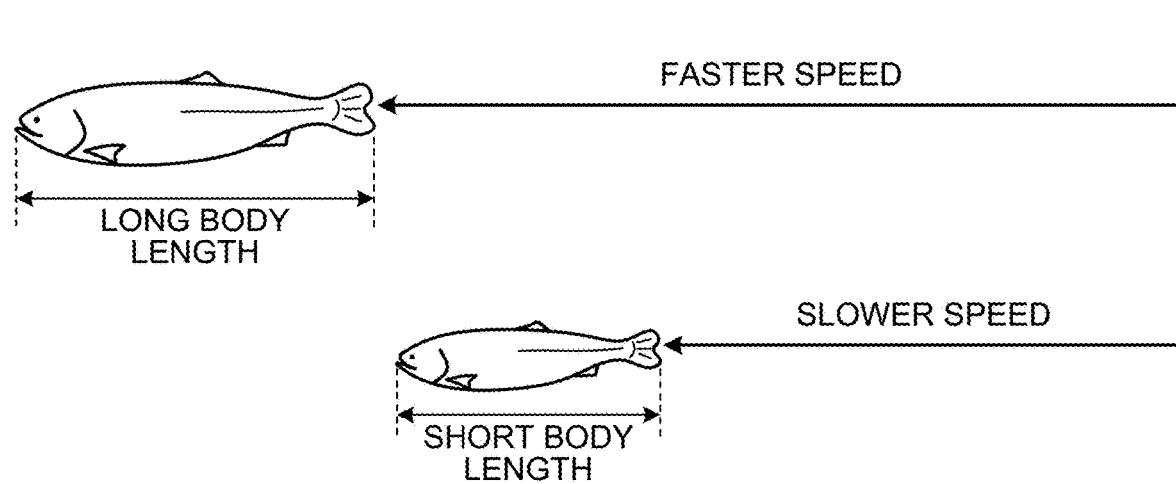
FIG. 7 is a diagram illustrating a relationship between a fish body length and a speed of fish.

FIG. 7 is a diagram illustrating a relationship between the body length and the speed of the fish. As the biological characteristics of fish, it is known that the longer (shorter) the body length of the fish, the faster (slower) the locomotion speed of the fish. Therefore, the generation unit 152 controls the behavior of each fish, so that the locomotion speed of each fish increases as the body length increases based on, as the internal parameter value, the body length of each fish in the fish school. Further, as the biological characteristics of fish, it is known that the larger (smaller) the amplitude of the tail fin of the fish, the faster (slower) the locomotion speed of the fish. Therefore, the generation unit 152 may control the behavior of each fish, so that the locomotion speed of the fish increases as the amplitude increases based on, as the internal parameter value, the magnitude of the amplitude of the tail fin of each fish in the fish school.

Figure 8:
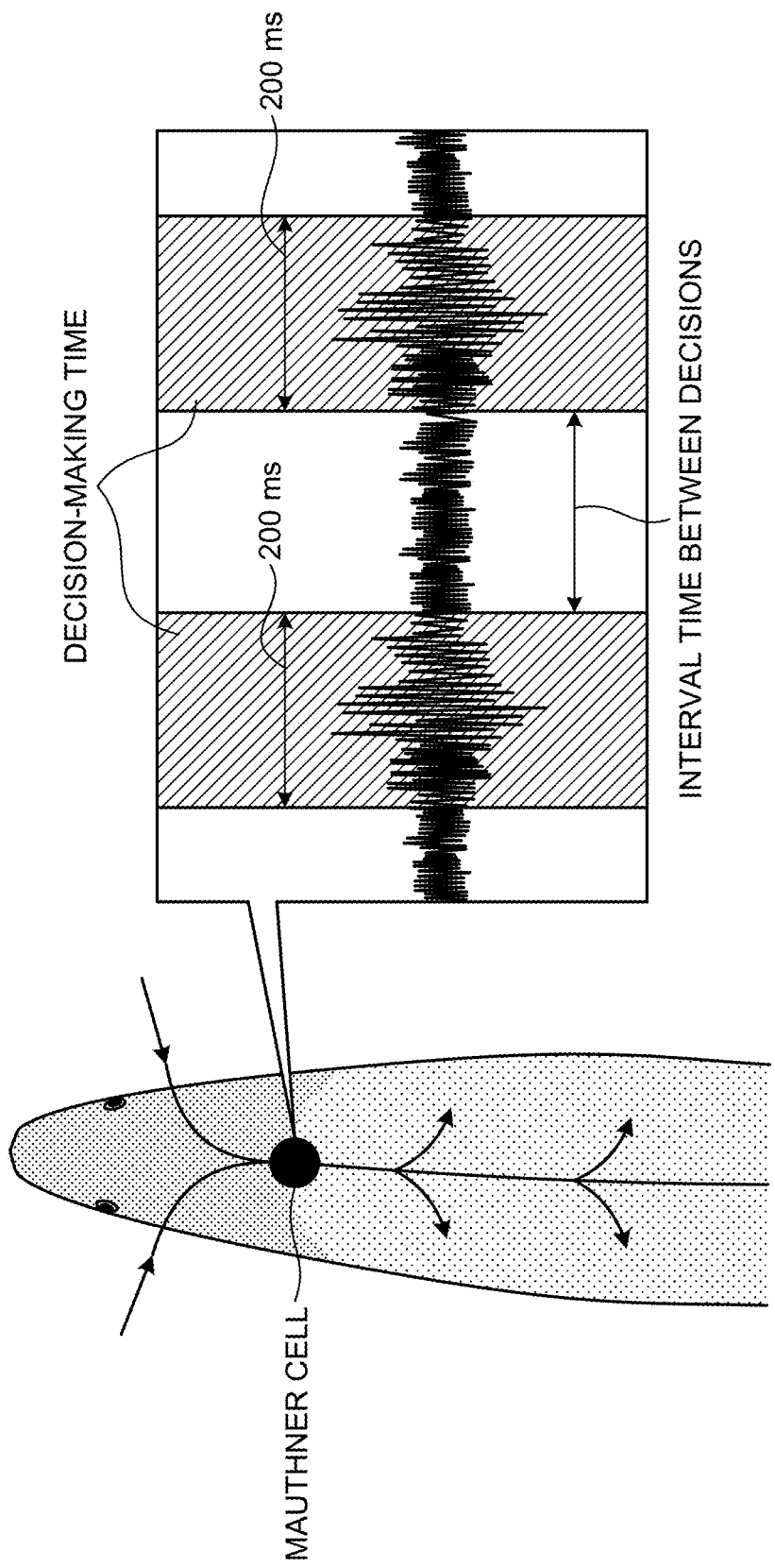
FIG. 8 is a diagram illustrating a relationship between a response speed of fish Mauthner cell and a length and interval of decision-making time required for fish.

FIG. 8 is a diagram illustrating a relationship between a response speed of Mauthner cell of fish and a length of decision-making time and interval time. As the biological characteristics of fish, it is known that the time required for fish to make decision for each behavior is dependent on a response speed of the Mauthner cell (a type of nerve cells) of fish. Here, the decision-making for each behavior of fish refers to a reflexive decision made by fish on "where to swim" and "how to swim". In the example illustrated in FIG. 8, the decision-making time required for each behavior by the fish is about 200 milliseconds, and the interval time between decisions is several hundred milliseconds. Therefore, the generation unit 152 controls the behavior of each fish based on, as the internal parameter value, the length and interval of decision-making time for each behavior by each fish in the fish school. Specifically, the generation unit 152 sets update time of the simulation image to the behavior decision-making time required for the fish (e.g., several hundred milliseconds). For example, the generation unit 152 controls a length of time that fish keeps a predetermined state (e.g., a "Slow Swim" state in FIG. 11 described later) according to the behavior decision-making time required for the fish (e.g., several hundred milliseconds). Subsequently, the generation unit 152 controls an interval time required for the fish to transit from the predetermined state (e.g., "Slow Swim" state in FIG. 11 described later) to another state (e.g., "C-start Left" state in FIG. 11 described later) according to the interval time between decisions (e.g., several hundred milliseconds). Then, the generation unit 152 controls the length of time that the fish keeps the other state (e.g., "C-start Left" state in FIG. 11 described later) according to the decision-making time required for the fish to perform each behavior (e.g., several hundred milliseconds).

In addition, as the biological characteristics of fish, it is known that the lower (higher) the water temperature around the fish (or the fish body temperature), the slower (faster) the response speed of the Mauthner cell of the fish. Therefore, the generation unit 152 may control the behavior of each fish based on, as the internal parameter value, the decision-making time and interval time, wherein the lower the water temperature around the fish, the longer the decision-making time and interval time become. In addition, fish may swim slower as its body is bigger. It is thus allowable to set the decision-making interval, which the fish requires to take a respective behavior, to a value that varies depending on the size of the fish body.

Figure 9:
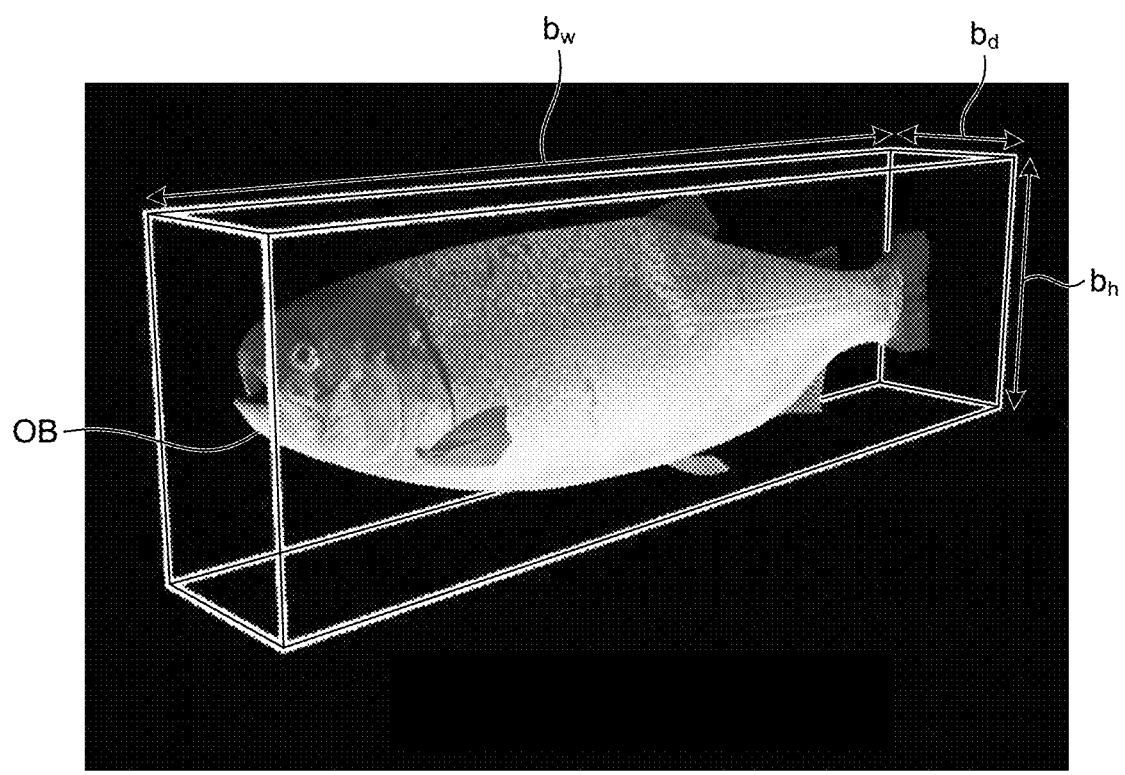
FIG. 9 is a diagram illustrating a three-dimensional CG image of fish and a three-dimensional bounding box.

FIG. 9 is a diagram illustrating a three-dimensional CG image of a fish and a three-dimensional bounding box. The fish illustrated in FIG. 9 is the three-dimensional CG image of the fish generated based on body measurement data actually measured for each fish species (hereinafter, also referred to as the actual aquaculture cage data). The generation unit 152 generates the simulation image using a realistic three-dimensional CG image of the fish generated based on the actual aquaculture cage data. The generation unit 152 may also generate the simulation image using the three-dimensional CG image of the fish that is not based on the actual aquaculture cage data. For example, the generation unit 152 may generate the simulation image using the three-dimensional CG image of the fish having body measurement data different from the actual aquaculture cage data based on values around the actual aquaculture cage data (e.g., values within a predetermined range in representative values of the actual measurement data). In addition, the generation unit 152 may set different body lengths, locomotion speeds, initial positions, initial states, weights, and the like for fish in the fish school included in the simulation image.

A frame surrounding the fish in FIG. 9 is a three-dimensional bounding box for identifying position information and size of the fish. The generation unit 152 generates the position information of each fish. For example, the generation unit 152 includes the position information indicating the center position of fish OB and an existence range of the fish OB. The fish position information is generated using, for example, three-dimensional coordinate information. In an example in FIG. 9, the generation unit 152 generates, as an example of the position information of the fish OB, information regarding coordinates $(b_x, b_y, b_z)$ (not illustrated) of the center of the fish OB and depth $b_d$, width $b_w$, and height $b_h$ of a minimum cuboid (three-dimensional bounding box) containing the fish OB.

Figure 10:
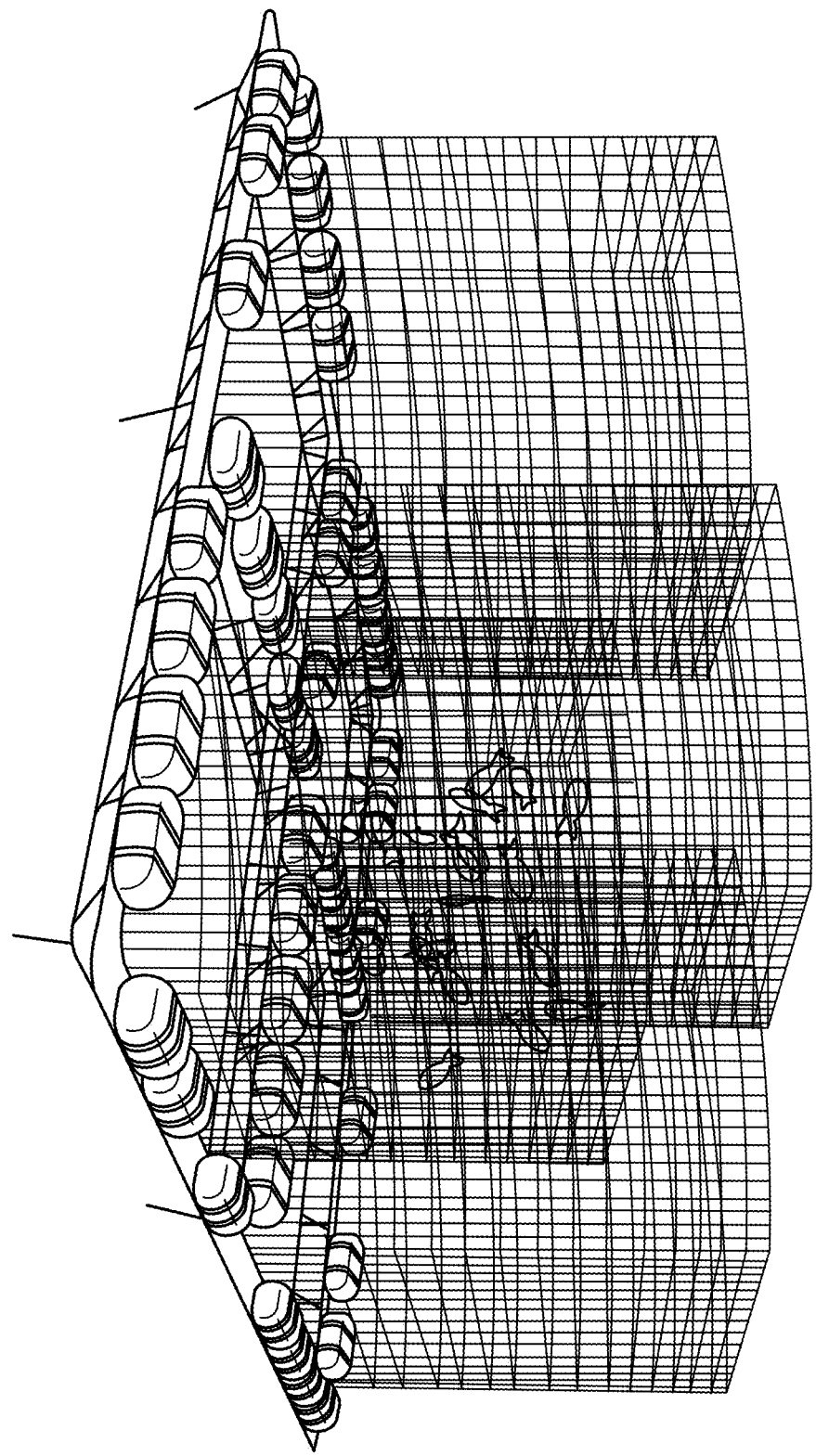
FIG. 10 is a diagram illustrating a three-dimensional CG image of a fish aquaculture cage.

FIG. 10 is a diagram illustrating a three-dimensional CG image of a fish aquaculture cage. FIG. 10 is the three-dimensional CG image of the fish aquaculture cage generated based on data including a latitude, longitude, water temperature, light intensity, and underwater image data of an actual aquaculture cage (hereinafter, also referred to as the actual aquaculture cage data). The generation unit 152 generates the simulation image using a realistic three-dimensional CG image of the aquaculture cage generated based on the actual aquaculture cage data. The generation unit 152 may generate the simulation image using the three-dimensional CG image of the aquaculture cage that is not based on the actual aquaculture cage data. For example, the generation unit 152 may generate the simulation image using a three-dimensional CG image of an aquaculture cage having data different from the actual aquaculture cage data (e.g. values within a predetermined range in representative values of the actual measurement data such as size, depth, water temperature, and light intensity of the aquaculture cage) based on values around the actual aquaculture cage data (e.g., values within the predetermined range in representative values of the actual measurement data). Further, the generation unit 152 may generate the simulation image using a three-dimensional CG image of the aquaculture cage having data different from the actual aquaculture cage data based on values not included in the actual data (e.g., data in a time zone not included in the actual measurement data).

Figure 11:
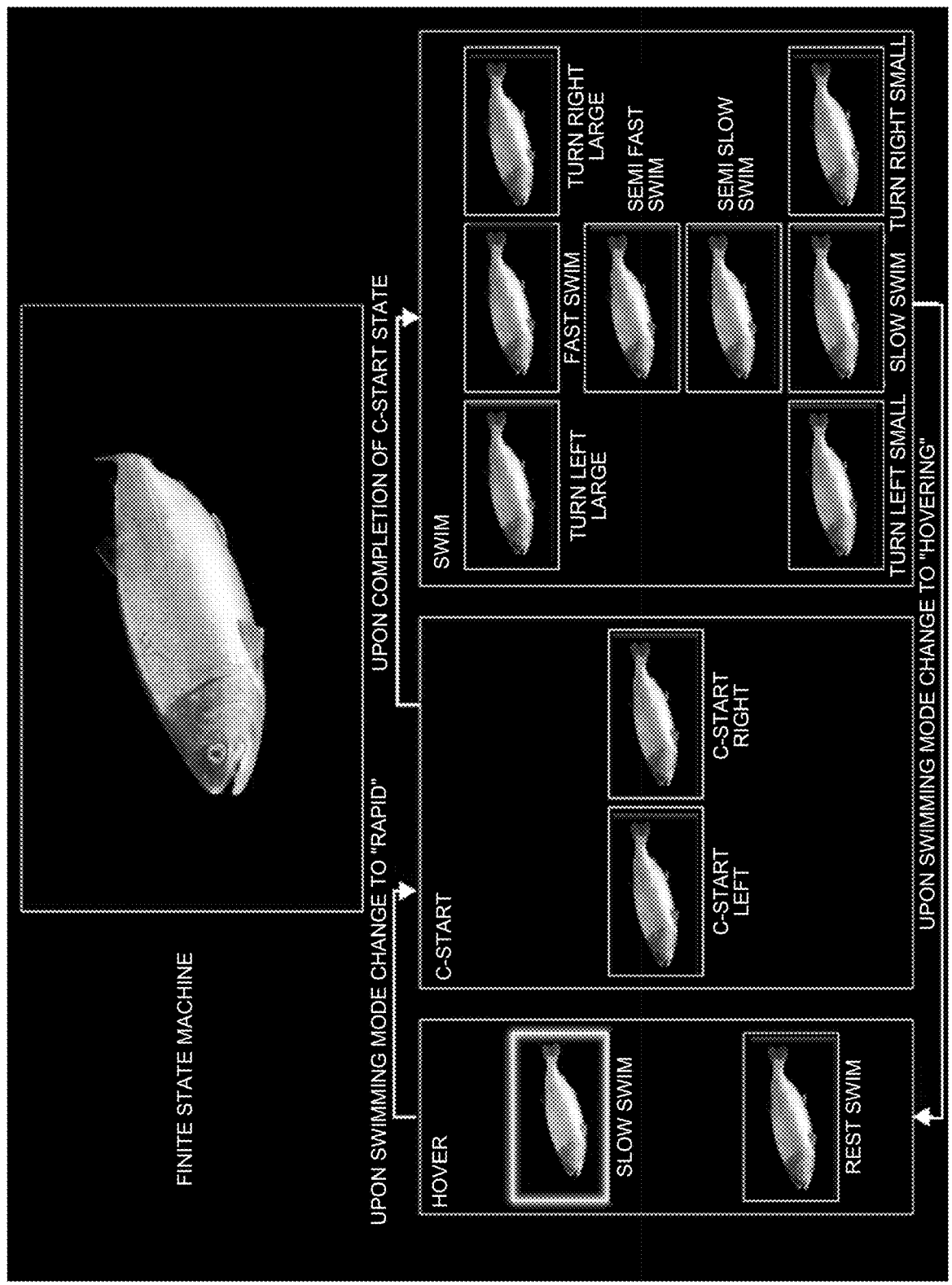
FIG. 11 is a diagram illustrating a finite state machine that determines a state of fish.

FIG. 11 is a diagram illustrating a finite state machine that determines the state of fish. As the biological characteristics of fish, it is known that the way fish swim (also called swimming method or swimming) can be classified into specific patterns by fish species. FIG. 11 illustrates the case where the fish species is salmon, and the swimming pattern may differ by fish species. As illustrated in FIG. 11, the generation unit 152 generates 12 kinds of animations showing 12 swimming patterns of the fish. In addition, the generation unit 152 transits the swimming state of each fish by determining the swimming state of each fish from 12 kinds of animations by the finite state machine (FSM).

For example, the generation unit 152 transits the swimming state of the fish from "Slow Swim" state to "C-start Left" state. Subsequently, the generation unit 152 transits the swimming state of the fish from "C-start Left" state to "Fast Swim" state. Subsequently, the generation unit 152 transits the swimming state of the fish from "Fast Swim" state to "Semi Fast Swim" state. Subsequently, the generation unit 152 transits the swimming state of the fish from "Semi Fast Swim" state to "Slow Swim" state. Subsequently, the generation unit 152 transits the swimming state of the fish from "Slow Swim" state to "Rest Swim" state. Further, the generation unit 152 can achieve smooth animation by complementing, in the state transition, between the states before the after the transition.

Figure 12:
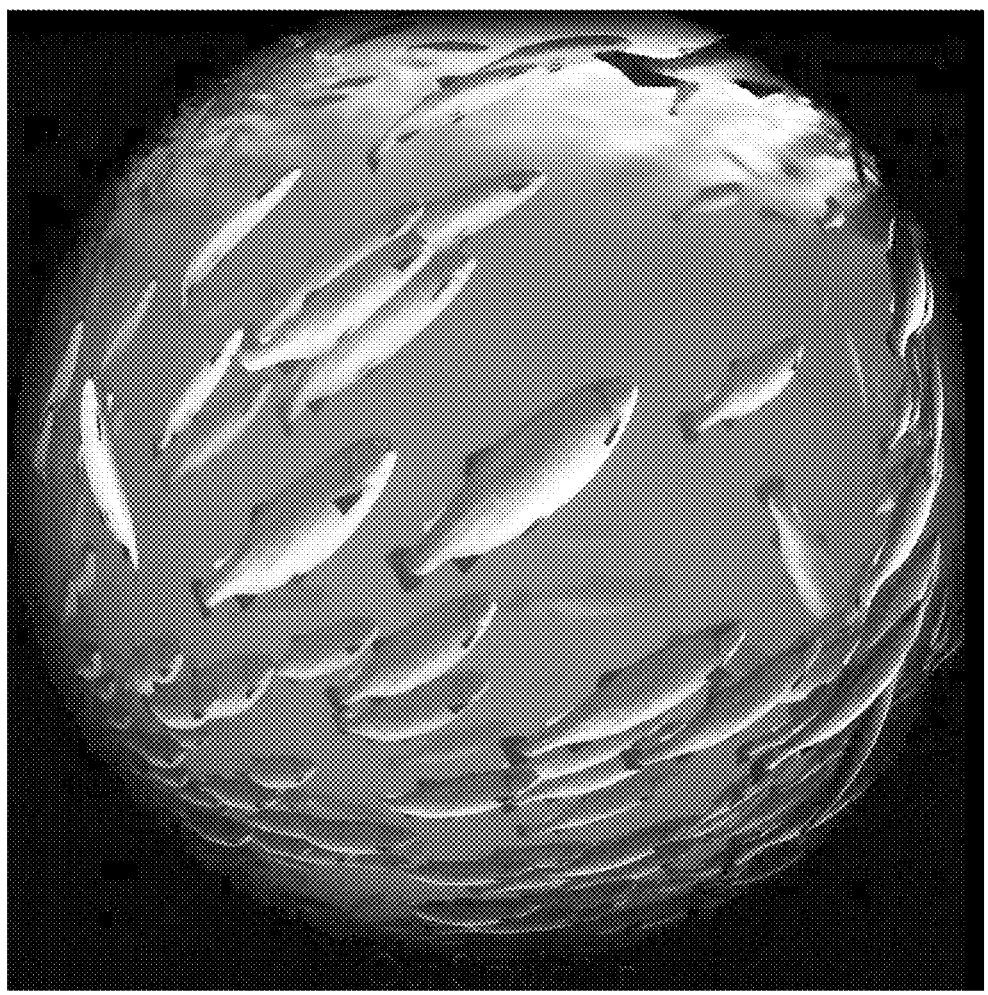
FIG. 12 is a diagram illustrating an example of the simulation image according to the embodiment.

FIG. 12 is a diagram illustrating an example of the simulation image according to the embodiment. The simulation image generated by the generation unit 152 is a moving image, but in FIG. 12, a portion of the moving image is illustrated as a still image. FIG. 12 is the diagram illustrating the example of the simulation image generated by the generation unit 152. The generation unit 152 generates the simulation image of the fish school as illustrated in FIG. 12 by controlling the three-dimensional CG images of a plurality of fish (see FIG. 9) to swim inside the three-dimensional CG image of the aquaculture cage (see FIG. 10) based on the internal parameter values, the external parameter values, and the shoaling parameter values acquired by the acquisition unit 151. The simulation image illustrated in FIG. 12 is a reproduction of an image captured by a virtual camera installed at a depth of 4 meters (or 6 meters) in the water of the three-dimensional CG image of the aquaculture cage illustrated in FIG. 10.

Figure 13:
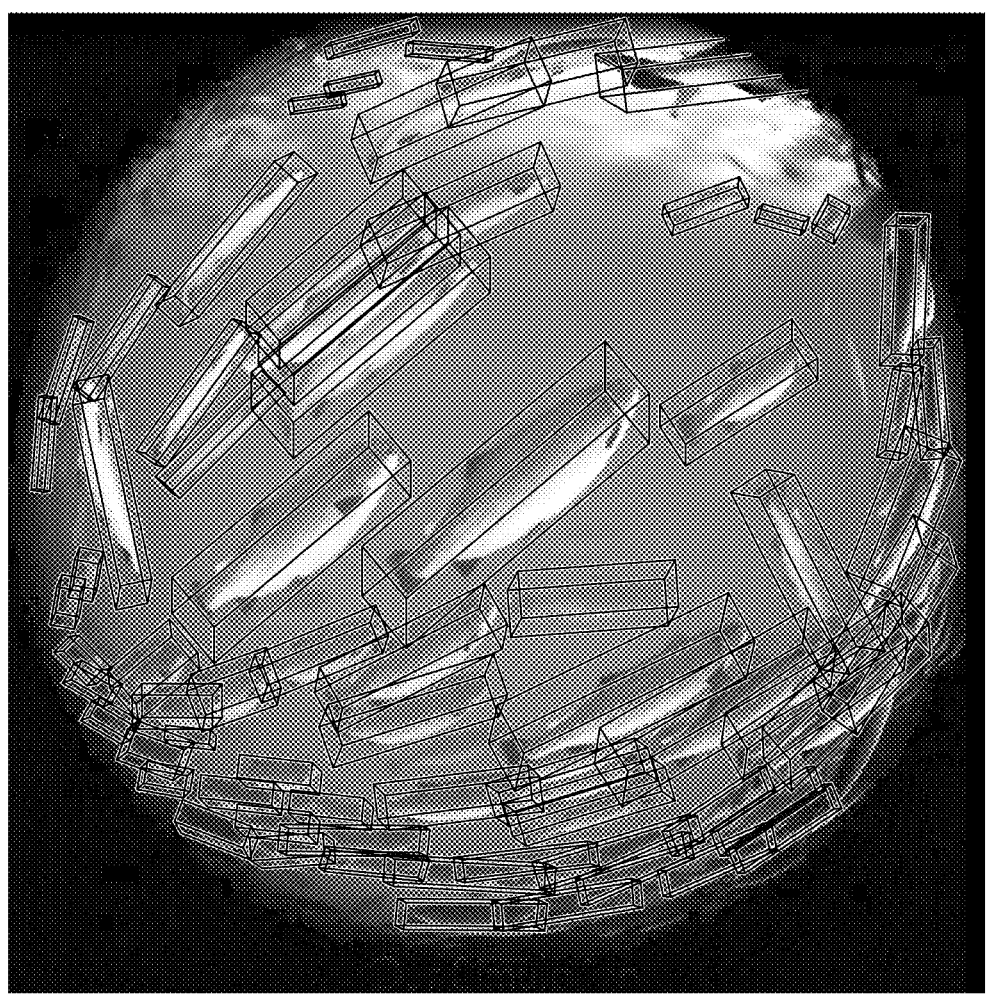
FIG. 13 is a diagram illustrating an example of training data in which the three-dimensional bounding box is added to each fish included in the simulation image according to the embodiment.

FIG. 13 is a diagram illustrating an example of training data in which the three-dimensional bounding box is added to each fish included in the simulation image according to the embodiment. After generating the simulation image, the generation unit 152 adds the three-dimensional bounding box indicating the position information of each fish included in the simulation image generated, so that the training data is generated. The generation unit 152 can easily generate the training data to which the three-dimensional bounding boxes are added by using the position information of each fish used when generating the simulation image.

Figure 14:
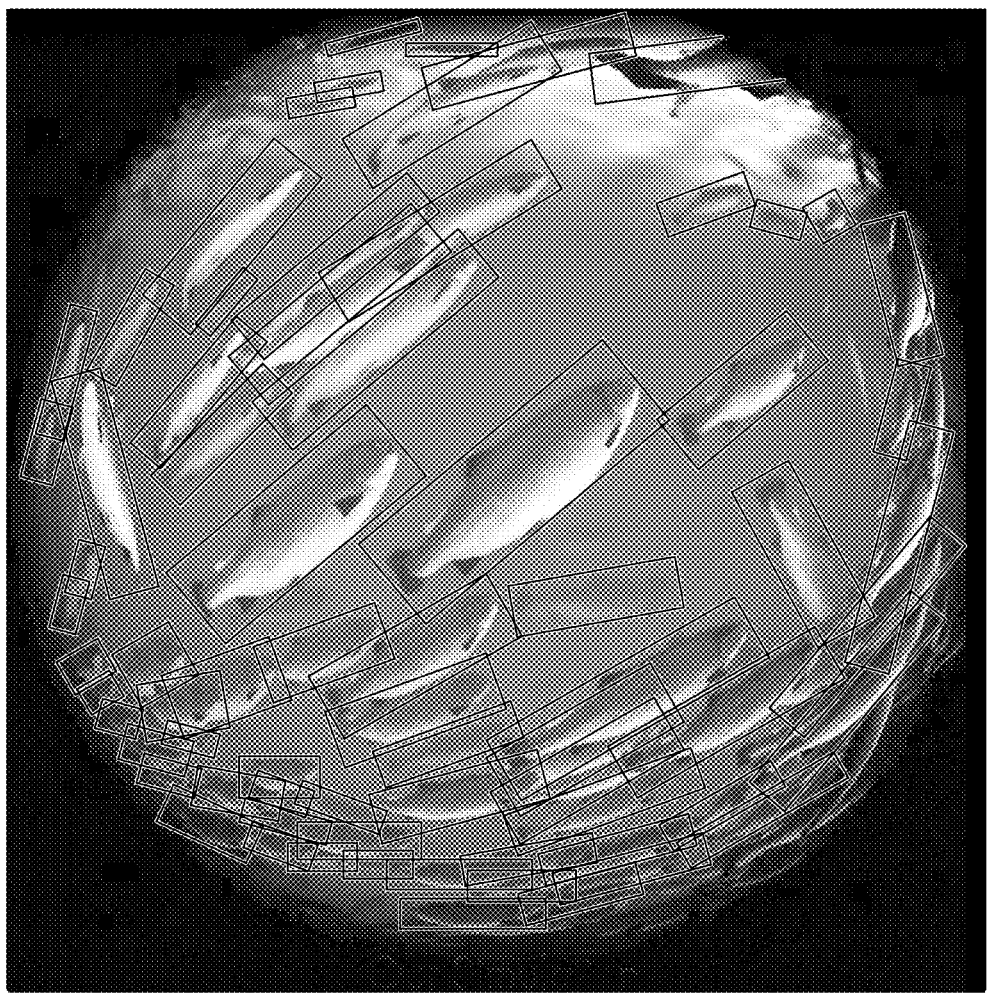
FIG. 14 is a diagram illustrating an example of training data in which a two-dimensional bounding box is added to each fish included in the simulation image according to the embodiment.

FIG. 14 is a diagram illustrating an example of the training data to which a two-dimensional bounding box is added to each fish included in the simulation image according to the embodiment. After generating the simulation image, the generation unit 152 adds the two-dimensional bounding box indicating the position information of each fish included in the simulation image generated, so as to generate the training data. The generation unit 152 can easily generate the training data to which the two-dimensional bounding boxes are added by using the position information of each fish used when generating the simulation image.

Figure 15:
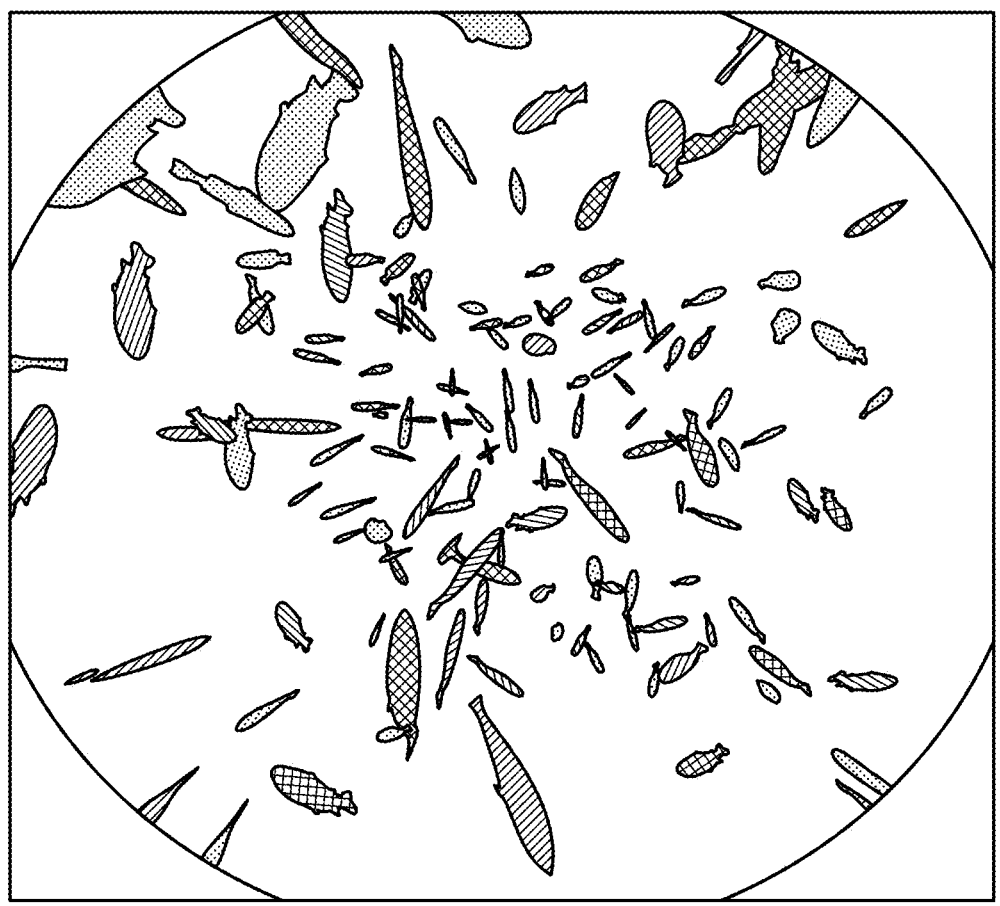
FIG. 15 is a diagram illustrating an example of training data in which each fish included in the simulation image is replaced with a silhouette according to the embodiment.

FIG. 15 is a diagram illustrating an example of the training data in which each fish included in the simulation image according to the embodiment is replaced with a silhouette. After generating the simulation image, the generation unit 152 generates the training data in which each fish included in the simulation image generated is replaced with the silhouette. The example in FIG. 15 is an example of classifying a plurality of fish by color coding. The color coding in FIG. 15 corresponds to addition of color elements. When the plurality of fish are present, the colors used for color-coding may be different for each fish, or the colors may be different according to fish classification information.

Figure 16:
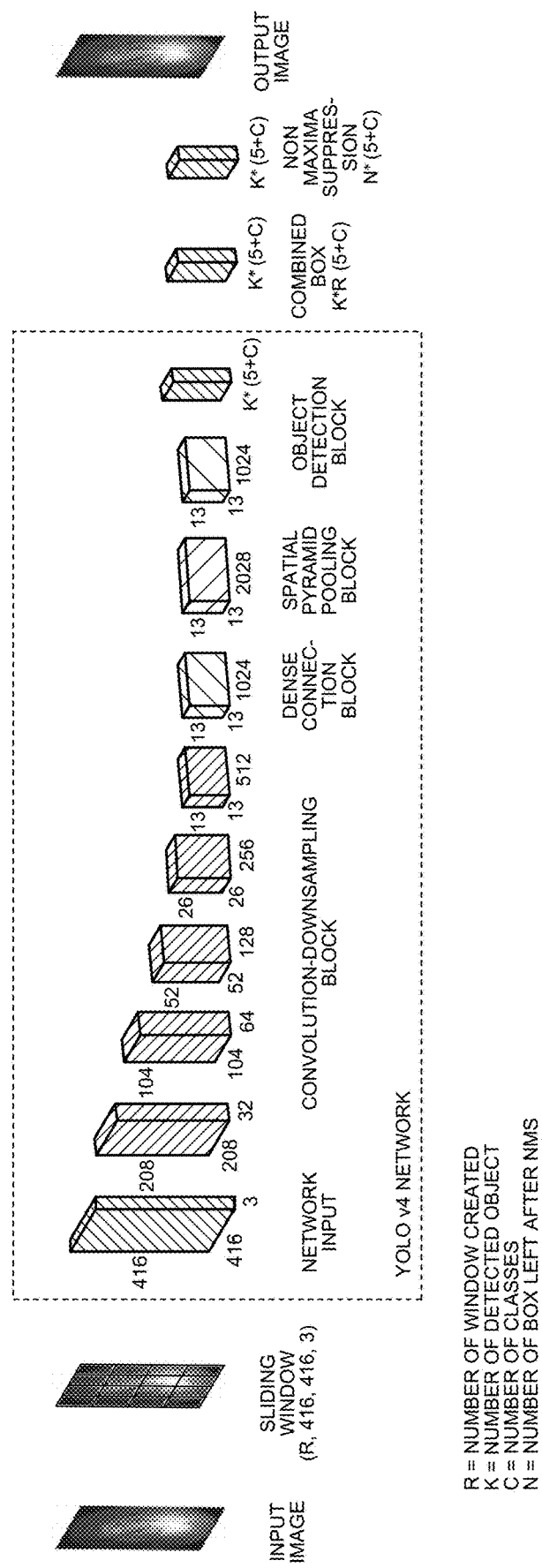
FIG. 16 is a diagram illustrating an example of a machine learning model according to the embodiment.

FIG. 16 is a diagram illustrating an example of a machine learning model according to the embodiment. The machine learning model illustrated in FIG. 16 includes a neural network of you only look once (YOLO). When the simulation image is input to the machine learning model, the generation unit 152 trains the machine learning model to output individual identification information of each fish included in the simulation image and information corresponding to the individual identification information of each fish (e.g., fish counts). In addition to YOLO, the generation unit 152 may apply to the machine learning model any known neural network used for object detection. For example, in addition to YOLO, the generation unit 152 can apply the Faster R-CNN or single shot multibox detector (SSD) developed for object detection to the machine learning model.

For example, the generation unit 152 trains a machine learning model M1 to output the simulation image to which the three-dimensional bounding boxes indicating the position information of each identified fish are added and the number of identified fish (fish counts in the fish school) when the simulation image generated is input to the machine learning model M1.

Further, the generation unit 152 trains a machine learning model M2 to output the simulation image to which the two-dimensional bounding boxes indicating the size of each identified fish are added and the number of identified fish (fish counts in the fish school) when the simulation image generated is input to the machine learning model M2.

Further, the generation unit 152 trains a machine learning model M3 to output the simulation image in which each identified fish is replaced with the silhouette and the number of identified fish (fish counts in the fish school) when the simulation image generated is input to the machine learning model M3.

In this way, the generation unit 152 trains the machine learning models to output the correct answer data generated based on the parameter information used for generating the simulation image or to output information corresponding to the correct answer data when the simulation image generated is input to the machine learning model.

Estimation Unit 153

The estimation unit 153 uses a trained machine learning model generated by the generation unit 152 to estimate information on the fish school included in a captured image from the captured image obtained by capturing the fish school. For example, the estimation unit 153 inputs the captured image to trained machine learning model M2 generated by the generation unit 152. Then, the estimation unit 153 uses the captured image, to which the two-dimensional bounding boxes are added, output from the machine learning model M2 and the number of identified fish (fish counts in the fish school) as an estimation result.

Output Control Unit 154

Figure 17:
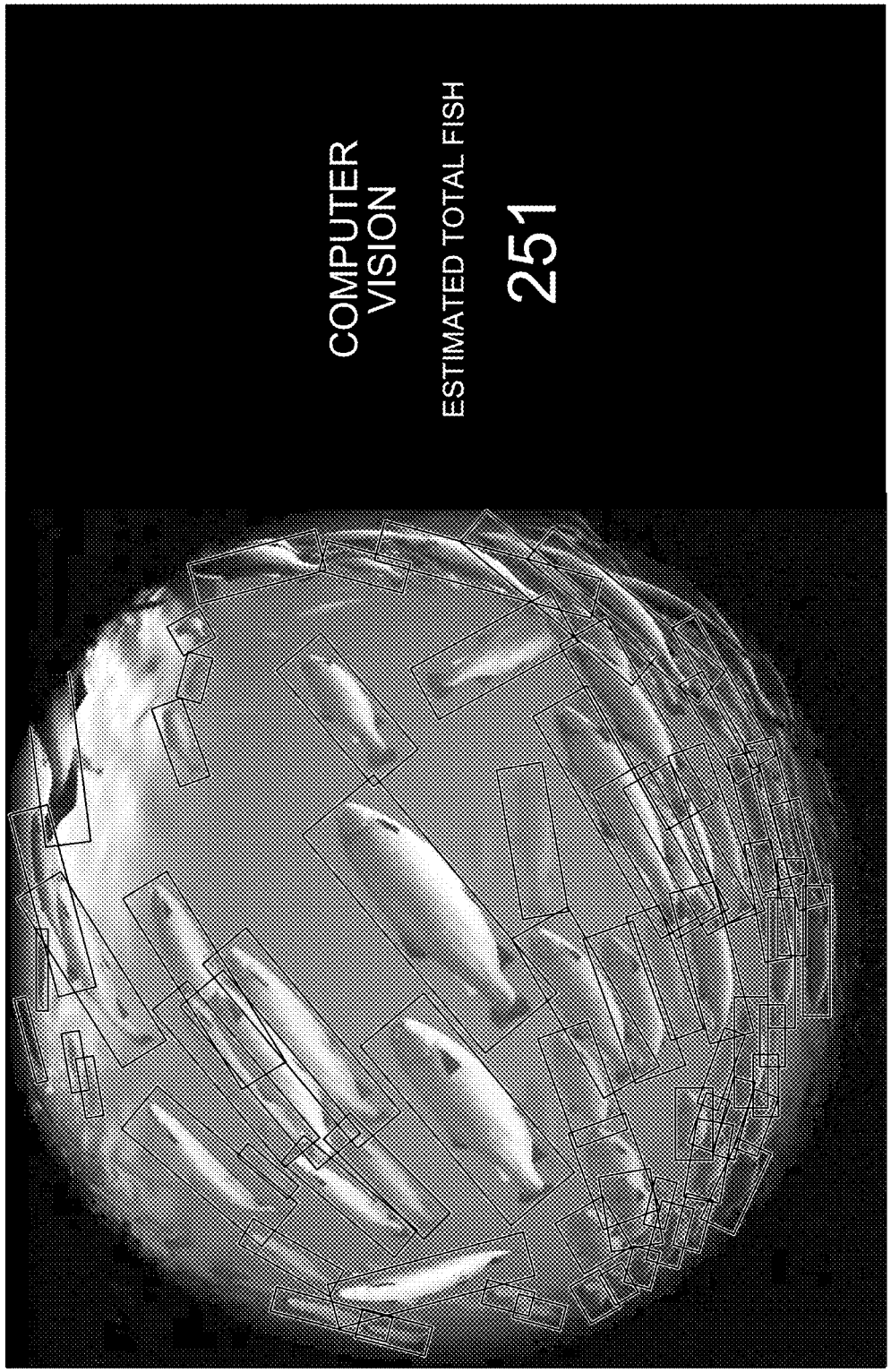
FIG. 17 is a diagram illustrating an example of a screen that outputs an estimation result of a captured image.

The output control unit 154 controls to display the estimation result estimated by the estimation unit 153 on a screen. FIG. 17 is a diagram illustrating an example of the screen that outputs the estimation result of the captured image. In the example illustrated in FIG. 17, the output control unit 154 displays the screen showing the captured image to which the two-dimensional bounding boxes are added and "251" that is the number of identified fish (fish counts in the fish school) as the estimation result estimated by the estimation unit 153.

3. Advantages

As described above, the information processor 100 according to the embodiment includes the acquisition unit 151 and the generation unit 152. The acquisition unit 151 acquires the internal parameter values regarding biological characteristics of fish, the external parameter values regarding surrounding environment characteristics of the fish, and the shoaling parameter values regarding shoaling characteristics that are the behaviors of one fish with respect to other fish. The generation unit 152 generates the simulation image including the behavior of each fish in the fish school based on the internal parameter values, the external parameter values, and the shoaling parameter values acquired by the acquisition unit 151.

In this way, the information processor 100 generates the simulation image including the behavior of fish school based on information on the biological characteristics of fish, information on the environment around the fish, and information on the shoaling characteristics of the fish. Accordingly, it is possible to accurately reproduce the behavior of fish school in the actual aquaculture cage. Still more, the information processor 100 can easily generate a large amount of simulation images covering various patterns by changing values of the plurality of parameters used for generating the simulation images. Furthermore, since the information processor 100 can utilize parameter values used for generating the simulation images as the correct answer data, a large amount of high-quality training data can be easily generated, compared with the case where the correct answer data is manually assigned.

This makes it possible for the information processor 100 to train the machine learning model for estimating, for example, the fish school information (e.g., fish counts) from the captured images using a large amount of high-quality training data. In other words, the information processor 100 can improve the estimation accuracy of the machine learning model for estimating, for example, the fish school information (e.g., fish counts) from the captured images by providing a large amount of high-quality training data for training. Therefore, the information processor 100 is capable of accurately estimating the fish school information.

In addition, the generation unit 152 generates the simulation images by controlling the behavior of each fish in the fish school based on the internal parameter values, the external parameter values, and the shoaling parameter values.

As a result, the information processor 100 controls the behavior of each fish in the fish school based on the information on the biological characteristics of the fish, the information on the environment around the fish, and the information on the shoaling characteristics of the fish. Accordingly, it is possible to accurately reproduce the behavior of fish school in the actual aquaculture cage. This makes it possible for the information processor 100 to train the machine learning model for estimating, for example, the fish school information (e.g., fish counts) from the captured images using a large amount of high-quality training data.

In addition, the generation unit 152 controls the behavior of each fish based on, as the internal parameter value, the length and interval of decision-making time for each behavior by each fish in the fish school.

As a result, the information processor 100 controls the behavior of each fish based on the length and interval of decision-making time for each behavior by each fish in the fish school. Accordingly, it is possible to accurately reproduce the behavior of each fish.

Still more, the generation unit 152 controls the behavior of each fish to swim toward the preferred water temperature area based on, as the internal parameter value, the water temperature preferred by each fish in the fish school.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish to swim toward the preferred water temperature area based on, as the external parameter value, the water temperature distribution in the aquaculture cage where each fish in the fish school is located.

As a result, the information processor 100 controls the behavior of each fish so as to behave according to the environment of actual aquaculture cage. Accordingly, it is possible to accurately reproduce the behavior of each fish in the actual aquaculture cage.

Still more, the generation unit 152 controls the behavior of each fish, so that each fish swims faster as the water temperature around each fish in the fish school increases based on, as the internal parameter value, the water temperature distribution in the aquaculture cage where each fish in the fish school is located.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish to swim toward the preferred light intensity area based on, as the internal parameter value, the light intensity preferred by each fish in the fish school.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish to swim toward the preferred light intensity area based on, as the external parameter value, the light-intensity distribution in the aquaculture cage where each fish in the fish school is located.

As a result, the information processor 100 controls the behavior of each fish so as to behave according to the environment of actual aquaculture cage. Accordingly, it is possible to accurately reproduce the behavior of each fish in the actual aquaculture cage.

Still more, the generation unit 152 controls the behavior of each fish, so that each fish behaves to avoid the obstacle, as the internal parameter value, when the distance between each fish in the fish school and the obstacle is equal to or less than the predetermined threshold.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish based on, as the internal parameter value, the repulsive force against each fish when the distance between each fish in the fish school and the obstacle is equal to or less than the predetermined threshold.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish according to the larger repulsive force as the distance decreases between each fish in the fish school and the obstacle.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish, so that the locomotion speed of each fish increases as the body length increases based on, as the internal parameter value, the body length of each fish in the fish school.

As a result, the information processor 100 controls the behavior of each fish so as to behave according to actual biology or habit of the fish. Accordingly, it is possible to accurately reproduce the behavior of each fish in the actual aquaculture cage.

Still more, the generation unit 152 controls the behavior of each fish to shoal with other fish, as the shoaling parameter value, when other fish are located within the predetermined zone from the position of each fish in the fish school.

As a result, the information processor 100 controls each fish to behave according to actual shoaling characteristics of the fish. Accordingly, it is possible to accurately reproduce the behavior of each fish in the actual aquaculture cage.

Still more, the generation unit 152 controls the behavior of each fish based on, as the shoaling parameter value, the cohesion force that tries to bring individuals in the fish school closer to each other so as not to fall apart.

As a result, the information processor 100 controls each fish to behave according to actual shoaling characteristics of the fish. Accordingly, it is possible to accurately reproduce the behavior of each fish in the actual aquaculture cage.

Still more, the generation unit 152 controls the behavior of each fish based on, as the shoaling parameter value, the separation force that individuals in the fish school try to separate from each other to avoid collision.

As a result, the information processor 100 controls each fish to behave according to actual shoaling characteristics of the fish. Accordingly, it is possible to accurately reproduce the behavior of each fish in the actual aquaculture cage.

Still more, the generation unit 152 controls the behavior of each fish based on, as the shoaling parameter value, the alignment force that tries to align a direction of individuals in the fish school to swim in a group.

As a result, the information processor 100 controls each fish to behave according to actual shoaling characteristics of the fish. Accordingly, it is possible to accurately reproduce the behavior of each fish in the actual aquaculture cage.

Still more, the generation unit 152 trains the machine learning model to output the correct answer data generated based on the parameter information used for generating the simulation images or to output information corresponding to the correct answer data when the simulation image is input to the machine learning model.

This makes it possible for the information processor 100 to train the machine learning model for estimating, for example, the fish school information (e.g., fish counts) from the captured images using a large amount of high-quality training data. In other words, the information processor 100 can improve the estimation accuracy of the machine learning model for estimating, for example, the fish school information (e.g., fish counts) from the captured images by providing a large amount of high-quality training data for training.

In addition, the information processor 100 further includes the estimation unit 153. The estimation unit 153 uses trained machine learning model generated by the generation unit 152 to estimate information on the fish school included in a captured image from the captured image obtained by capturing the fish school.

Accordingly, the information processor 100 can improve the estimation accuracy of the machine learning model that estimates, for example, the fish school information (e.g., fish counts) from the captured image by learning a large amount of high-quality training data. Therefore, the information processor 100 can accurately estimate the fish school information by using the trained machine learning model. Still more, by using image recognition, the information processor 100 can accurately estimate the fish school information without directly touching the fish (non-contact), so that a stress on the fish can be reduced. Still more, by using the image recognition, the information processor 100 can obtain a highly accurate estimation result in a short time as compared with the case where a person scoops fish with a net.

4. Hardware Configuration

Figure 18:
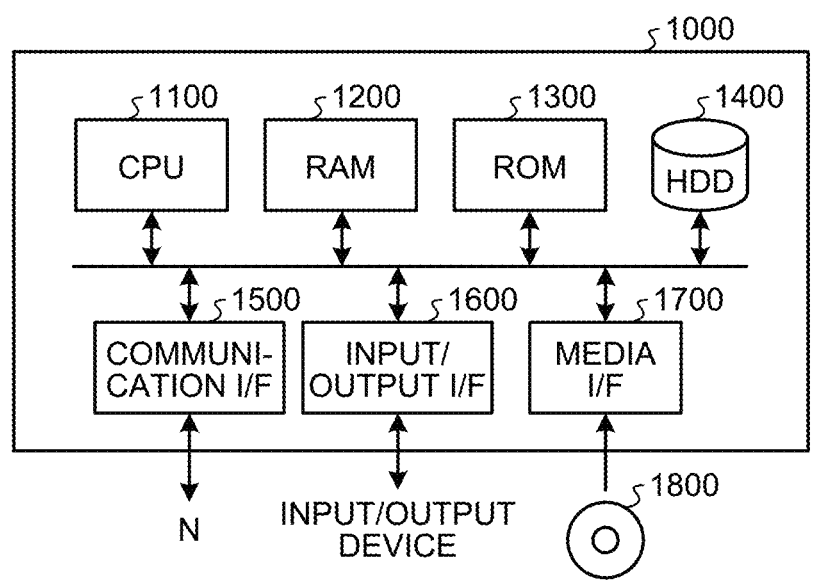
FIG. 18 is a hardware configuration diagram illustrating an example of a computer that implements functions of the information processor.

Further, the information processor 100 according to the above-described embodiment is realized by, for example, a computer 1000 having a configuration as illustrated in FIG. 18. FIG. 18 is a hardware configuration diagram illustrating an example of a computer that implements functions of the information processor 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400, and controls each unit. The ROM 1300 stores a boot program executed by the CPU 1100 when the computer 1000 is started, a program dependent on hardware of the computer 1000, and the like.

The HDD 1400 stores a program executed by the CPU 1100, data used by the program, and the like. The communication interface 1500 receives data from another device via a predetermined communication network and sends it to the CPU 1100, and transmits data generated by the CPU 1100 to other equipment via the predetermined communication network.

The CPU 1100 controls an output device such as a display and a printer, and an input device such as a keyboard and a mouse via the input/output interface 1600. The CPU 1100 acquires data from the input device via the input/output interface 1600. Further, the CPU 1100 outputs the data generated to the output device via the input/output interface 1600.

The media interface 1700 reads a program or data stored in the recording medium 1800, and provides the program or data to the CPU 1100 via the RAM 1200. The CPU 1100 loads the program from the recording medium 1800 onto the RAM 1200 via the media interface 1700, and executes the program loaded. The recording medium 1800 is, for example, an optical recording medium such as a digital versatile disc (DVD) and phase change rewritable disk (PD), a magneto-optical recording medium such as a magneto-optical disk (MO), a tape medium, a magnetic recording medium, a semiconductor memory, or the like.

For example, when the computer 1000 functions as the information processor 100 according to the embodiment, the CPU 1100 of the computer 1000 implements the functions of the control unit 150 by executing programs loaded on the RAM 1200. The CPU 1100 of the computer 1000 reads these programs from the recording medium 1800 and executes them, but as another example, these programs may be acquired from another device via the predetermined communication network. Although some of the embodiments of the present application have been described in detail with reference to the drawings, these are examples. The present disclosure may be practiced in other forms by various modifications or improvements made based on the knowledge of those skilled in the art, including the embodiments described in the present disclosure.

5. Others

Furthermore, among the processes described in the above-described embodiments and modifications, all or part of the processes described as being automatically performed may be manually performed, or all or part of the processes described as being manually performed may be automatically performed by a known method. In addition, process steps, specific names, and information including various pieces of data and parameters illustrated in the above document and drawings can be arbitrarily changed unless otherwise specified. For example, the various types of information illustrated in each figure is not limited to the illustrated information.

Further, each component of each of the illustrated devices is a functional concept, and does not necessarily have to be physically configured as illustrated in the drawings. In other words, the specific forms of distribution or integration of devices are not limited to the one illustrated in the drawings, and all or part of each device is functionally or physically distributed or integrated in any unit according to various loads and usage conditions.

Further, the above-described embodiments and modifications can be appropriately combined as long as processes do not contradict each other.

Further, the above-described "section, module, and unit" can be read as "means" or "circuit". For example, the generation unit can be read as a generation means or a generation circuit.

The present disclosure is capable of accurately estimating the fish school information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing method implemented by a computer, the information processing method comprising:
   capturing an image of a fish school in an aquaculture cage;
   acquiring an internal parameter value regarding a biological characteristic of fish in the fish school, an external parameter value regarding a surrounding environment characteristic of the fish in the fish school, and a shoaling parameter value regarding a shoaling behavior characteristic that is a behavior of one fish with respect to other fish in the fish school;
   generating a simulation image as a form of training data for a machine learning model, the simulation image including a behavior of each fish in the fish school based on the internal parameter value, the external parameter value, and the shoaling parameter value acquired in the acquiring to improve estimation accuracy of the machine learning model for estimating fish school information from the captured image of the fish in the fish school, the estimated fish school information includes a count of a number of fish in the fish school; and
   feeding the fish in the fish school in the aquaculture cage based on the count of the number of fish, wherein
   the generating the simulation image includes generating a preferred light intensity distribution in the aquaculture cage to control the behavior of each fish in the fish school to swim toward a preferred light intensity area based on the internal parameter value or the external parameter value, the internal parameter value being a light intensity preferred by each fish and the external parameter value being the light intensity distribution in the aquaculture cage where each fish is located, and
   the generating the simulation image for the machine learning model includes:
      training a first machine learning model to output the simulation image including three-dimensional bounding boxes indicating position information of each identified fish and a number of the identified fish;
      training a second machine learning model to output the simulation image including two-dimensional bounding boxes indicating a size of each identified fish and the number of the identified fish; and
      training a third machine learning model to output the simulation image with each identified fish being replaced with a silhouette and the number of identified fish.

2. The information processing method according to claim 1, wherein
   the generating the simulation image includes generating the simulation image by controlling the behavior of each fish in the fish school based on the internal parameter value, the external parameter value, and the shoaling parameter value.

3. The information processing method according to claim 1, wherein
   the generating the simulation image includes controlling the behavior of each fish in the fish school based on the internal parameter value, the internal parameter value being a length of time required for each fish to make a decision on each behavior and an interval of the time.

4. The information processing method according to claim 1, wherein
   the generating the simulation image includes controlling the behavior of each fish in the fish school to swim toward a preferred water temperature area based on the internal parameter value, the internal parameter value being a water temperature preferred by each fish.

5. The information processing method according to claim 1, wherein
the generating the simulation image includes controlling the behavior of each fish in the fish school to swim toward a preferred water temperature area based on the external parameter value, the external parameter value being a water temperature distribution in an aquaculture cage where each fish is located.

6. The information processing method according to claim 1, wherein
the generating the simulation image includes controlling the behavior of each fish in the fish school to increase a locomotion speed as a water temperature around each fish in the fish school increases based on the internal parameter value, the internal parameter value being a water temperature distribution in the aquaculture cage where each fish is located.

7. The information processing method according to claim 1, wherein
the generating the simulation image includes controlling the behavior of each fish in the fish school to perform an avoidance behavior to avoid an obstacle when the internal parameter value is equal to or less than a predetermined threshold, the internal parameter value being a distance between each fish and the obstacle.

8. The information processing method according to claim 1, wherein
the generating the simulation image includes controlling the behavior of each fish in the fish school according to a repulsive force acting on each fish when the internal parameter value is equal to or less than a predetermined threshold, the internal parameter value being a distance between each fish and an obstacle.

9. The information processing method according to claim 8, wherein
the generating the simulation image includes controlling the behavior of each fish in the fish school according to the repulsive force that increases as the distance between each fish and the obstacle decreases.

10. The information processing method according to claim 1, wherein
the generating the simulation image includes controlling the behavior of each fish in the fish school to increase a locomotion speed as a body length increases based on the internal parameter value, the internal parameter value being the body length of each fish.

11. The information processing method according to claim 1, wherein
the generating the simulation image includes controlling the behavior of each fish in the fish school to perform a shoaling behavior, as the shoaling parameter value, when another fish is located within a predetermined zone from a position of each fish.

12. The information processing method according to claim 1, wherein
the generating the simulation image includes controlling the behavior of each fish in the fish school based on the shoaling parameter value, the shoaling parameter value being a cohesion force to bring each fish closer to each other so as not to fall apart.

13. The information processing method according to claim 1, wherein
the generating the simulation image includes controlling the behavior of each fish in the fish school based on the shoaling parameter value, the shoaling parameter value being a separation force to separate each fish from each other to avoid mutual collision.

14. The information processing method according to claim 1, wherein
the generating the simulation image includes controlling the behavior of each fish in the fish school based on the shoaling parameter value so that each fish performs a shoaling behavior when other fish are located within a predetermined zone, the shoaling parameter value being based on a size of the space in the aquaculture cage, size of the fish and a density of the fish school, and the shoaling parameter value being an alignment force to align a direction that each fish swims as a group.

15. The information processing method according to claim 1, wherein
the generating the simulation image includes training at least one of the first machine learning model, the second machine learning model or the third machine learning model to output correct answer data generated based on parameter information used to generate the simulation image or to output information corresponding to the correct answer data when the simulation image is input to the respective one of the first machine learning model, the second machine learning model and the third machine learning model.

16. The information processing method according to claim 15, further comprising:
estimating information on the fish school by using at least one of the first machine learning model, the second machine learning model or the third machine learning model that is trained and generated in the generating the simulation image.

17. A non-transitory computer-readable recording medium having stored therein a program that causes a computer to execute a process comprising:
capturing an image of a fish school in an aquaculture cage;
acquiring an internal parameter value regarding a biological characteristic of fish in the fish school, an external parameter value regarding a surrounding environment characteristic of the fish in the fish school, and a shoaling parameter value regarding a shoaling behavior characteristic that is a behavior of one fish with respect to other fish in the fish school;
generating a simulation image as a form of training data for a machine learning model, the simulation image including a behavior of each fish in the fish school based on the internal parameter value, the external parameter value, and the shoaling parameter value acquired in the acquiring to improve estimation accuracy of the machine learning model for estimating fish school information from the captured image of the fish in the fish school, the estimated fish school information includes a count of a number of fish in the fish school; and
feeding the fish in the fish school in the aquaculture cage based on the count of the number of fish, wherein
the generating the simulation image includes generating a preferred light intensity distribution in the aquaculture cage to control the behavior of each fish in the fish school to swim toward a preferred light intensity area based on the internal parameter value or the external parameter value, the internal parameter value being a light intensity preferred by each fish and the external parameter value being the light intensity distribution in the aquaculture cage where each fish is located, and the generating the simulation image for the machine learning model includes:
  training a first machine learning model to output the simulation image including three-dimensional bounding boxes indicating position information of each identified fish and a number of the identified fish;
  training a second machine learning model to output the simulation image including two-dimensional bounding boxes indicating a size of each identified fish and the number of the identified fish; and
  training a third machine learning model to output the simulation image with each identified fish being replaced with a silhouette and the number of identified fish.

18. An information processor comprising:
circuitry configured to:
  capture an image of a fish school in an aquaculture cage;
  acquire an internal parameter value regarding a biological characteristic of fish in the fish school, an external parameter value regarding a surrounding environment characteristic of the fish in the fish school, and a shoaling parameter value regarding a shoaling behavior characteristic that is a behavior of one fish with respect to other fish in the fish school;
  generate a simulation image as a form of training data for a machine learning model, the simulation image including a behavior of each fish in the fish school based on the acquired internal parameter value, the external parameter value, and the shoaling parameter value to improve estimation accuracy of the machine learning model for estimating fish school information from the captured image of the fish in the fish school, the estimated fish school information includes a count of a number of fish in the fish school; and
  enable a user to feed the fish in the fish school in the aquaculture cage based on the count of the number of fish, wherein
the circuitry configured to generate the simulation image is further configured to generate a preferred light intensity distribution in the aquaculture cage to control the behavior of each fish in the fish school to swim toward a preferred light intensity area based on the internal parameter value or the external parameter value, the internal parameter value being a light intensity preferred by each fish and the external parameter value being the light intensity distribution in the aquaculture cage where each fish is located, and
the circuitry configured to generate the simulation image for the machine learning model is further configured to:
  train a first machine learning model to output the simulation image including three-dimensional bounding boxes indicating position information of each identified fish and a number of the identified fish;
  train a second machine learning model to output the simulation image including two-dimensional bounding boxes indicating a size of each identified fish and the number of the identified fish; and
  train a third machine learning model to output the simulation image with each identified fish being replaced with a silhouette and the number of identified fish.

* * * * *